United States Patent
Phillips et al.

(10) Patent No.: US 12,549,739 B2
(45) Date of Patent: Feb. 10, 2026

(54) OPTIMIZED FAST VIDEO FRAME REPAIR FOR EXTREME LOW LATENCY RTP DELIVERY

(71) Applicant: Adeia Guides Inc., San Jose, CA (US)

(72) Inventors: Christopher Phillips, Hartwell, GA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/622,467

(22) Filed: Mar. 29, 2024

(65) Prior Publication Data

US 2025/0310538 A1    Oct. 2, 2025

(51) Int. Cl.
*H04N 19/159*    (2014.01)
*H04N 19/119*    (2014.01)
*H04N 19/174*    (2014.01)

(52) U.S. Cl.
CPC ......... *H04N 19/159* (2014.11); *H04N 19/119* (2014.11); *H04N 19/174* (2014.11)

(58) Field of Classification Search
CPC ...... H04N 19/61; H04N 19/66; H04N 19/105; H04N 19/107; H04N 19/119; H04N 19/159; H04N 19/895
See application file for complete search history.

(56) References Cited

U.S. PATENT DOCUMENTS

| 8,406,296 B2* | 3/2013 | NepomucenoLeung ................... H04N 21/6375 375/240.27 |
| 8,432,804 B2* | 4/2013 | Larson ............... H04N 21/2365 370/235 |
| 11,689,625 B1 | 6/2023 | Phillips et al. |
| 2016/0056927 A1* | 2/2016 | Liu ........................ H04L 47/746 370/216 |
| 2020/0037029 A1* | 1/2020 | He .......................... H04L 65/612 |
| 2021/0037250 A1* | 2/2021 | Makar ................... H04N 19/107 |
| 2024/0146994 A1* | 5/2024 | He .......................... H04N 21/435 |

OTHER PUBLICATIONS

B. Bross, et al., "Overview of the versatile video coding (VVC) standard and its applications," IEEE T-CSVT, vol. 31, No. 10, Oct. 2021.

(Continued)

*Primary Examiner* — Justin W Rider
(74) *Attorney, Agent, or Firm* — HG LAW LLP

(57) ABSTRACT

Systems and methods are disclosed for modifying the encoding of a video in an ultra low-latency environment in response to a dropped or corrupted packet. A video source encodes the video using slice or tile encoding. Slice encoding divides each frame of the video into slices which are independently encoded. Each frame in a slice stream is either intra-coded or predictively encoded. Each slice or tile in an Intra frame, Predicted frame or bi-directional frame may be independently encoded as an Intra slice or tile, a predicted slice or tile or a Bi-directional slice or tile. Slices or tiles of each frame are multiplexed into data packets for transmission. In response to feedback indicating that a data packet was corrupted, is late or dropped, the video source determines what data was in the transmission data packet and modifies encoding of a subsequent slice or tile in the slice or tile stream to be intra-coded.

18 Claims, 27 Drawing Sheets

(56) References Cited

OTHER PUBLICATIONS

Christopher Phillips, "Data Transmission Throttling and Data Quality Updating for a Slam Device", (U.S. Appl. No. 18/128,934, filed Mar. 30, 2023).
Christopher Phillips, "Data Transmission Throttling and Data Quality Updating for a Slam Device", (U.S. Appl. No. 18/128,935, filed Mar. 30, 2023).
G. Sullivan, et al., "Overview of the high efficiency video coding (HEVC) standard," IEEE T-CSVT, vol. 22, No. 12, Dec. 2012.
Gstreamer, "News—GStreamer 1.24.2 stable bug fix release", (https://gstreamer.freedesktop.org/), (4 pages).
J. Rey, et al. "RTP Retransmission Payload Format", Network Working Group, (https://datatracker.ietf.org/doc/html/rfc4588),(The Internet Society (2006),(8 pages).
Tao Chen, et al., "Video Compression at Scene Changes for Low Latency Interactive Experience", (U.S. Appl. No. 17/992,582, filed Nov. 22, 2022).

* cited by examiner

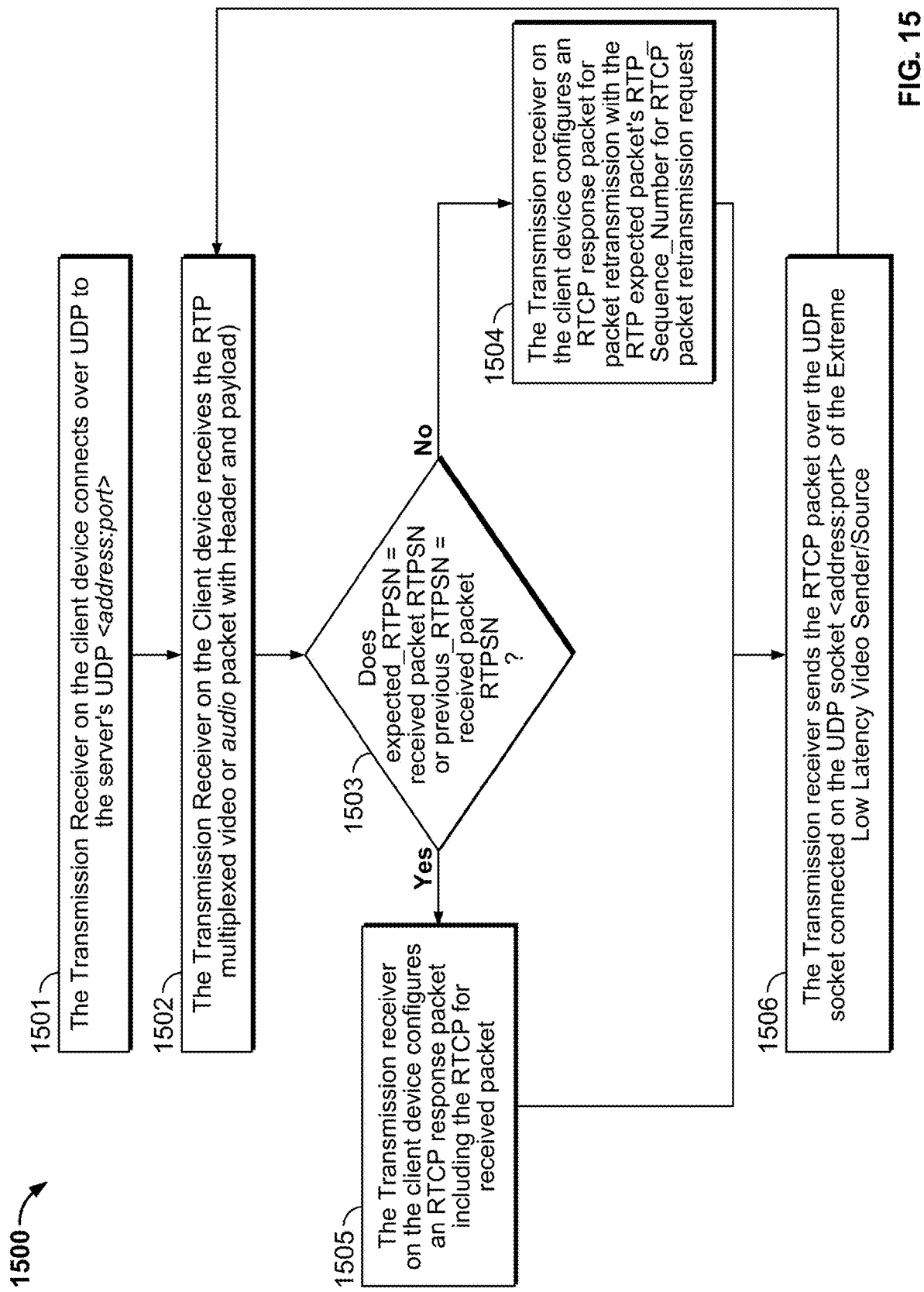

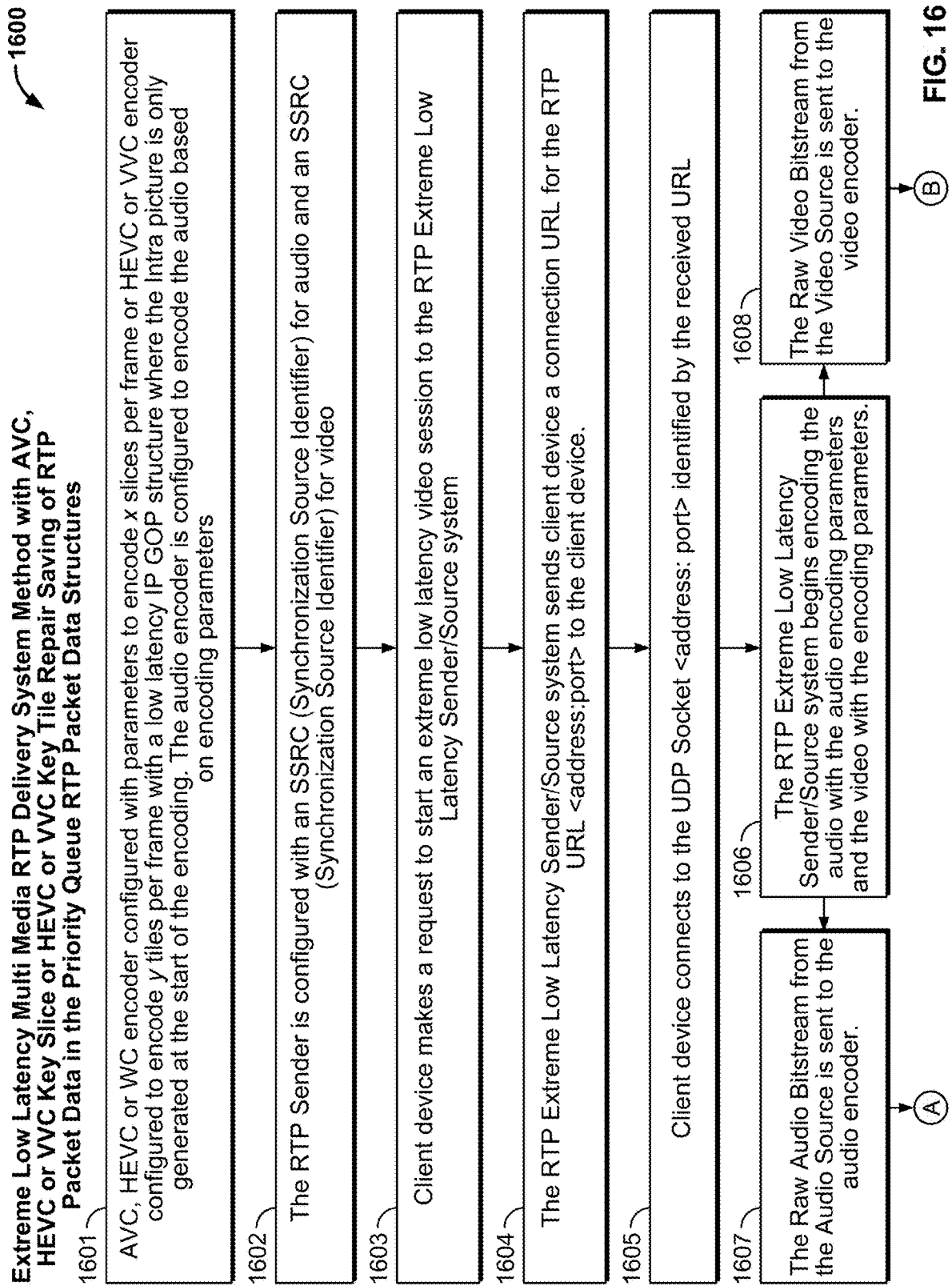

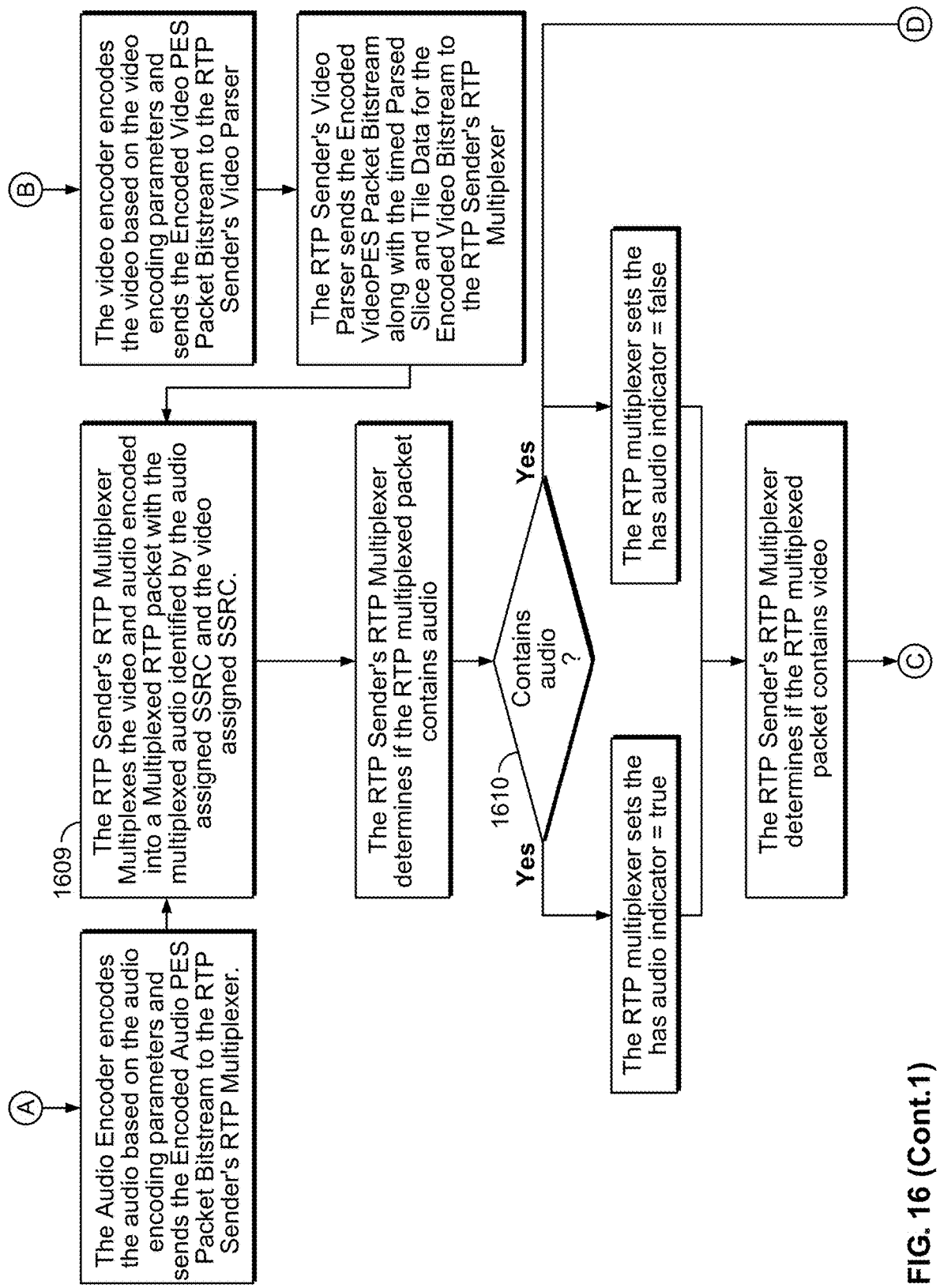
FIG. 16 (Cont.1)

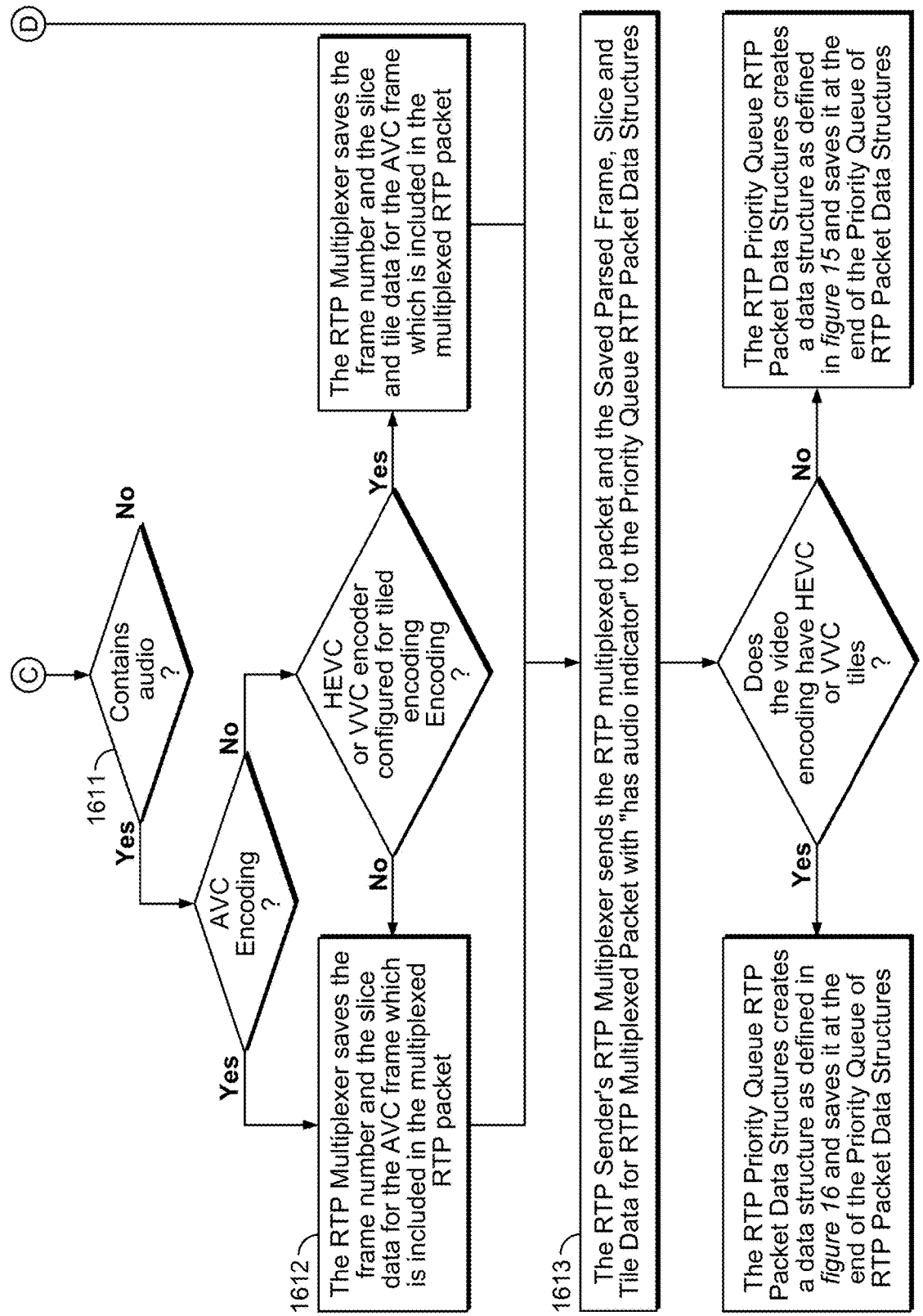
FIG. 16 (Cont.2)

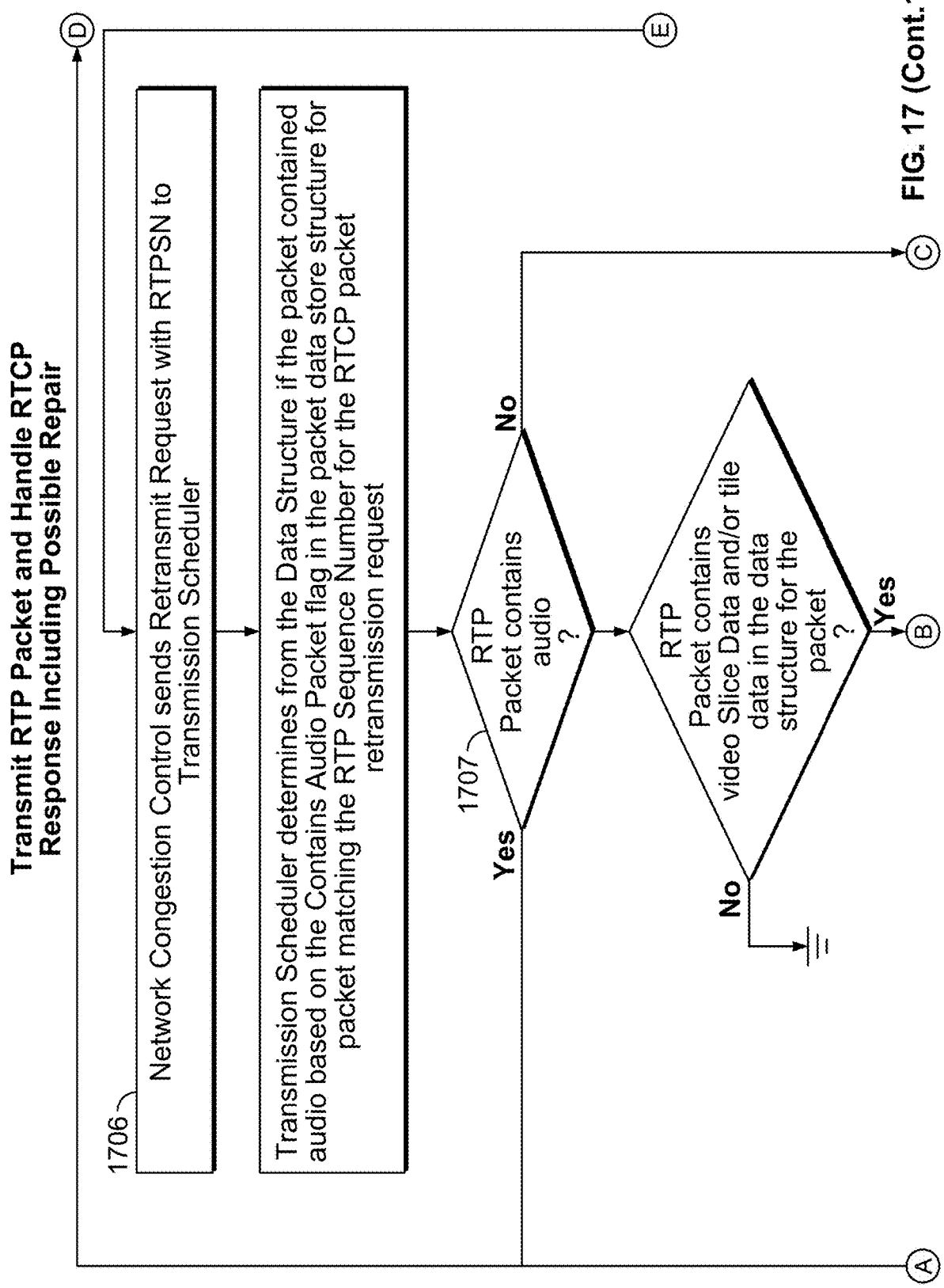
FIG. 17 (Cont.1)

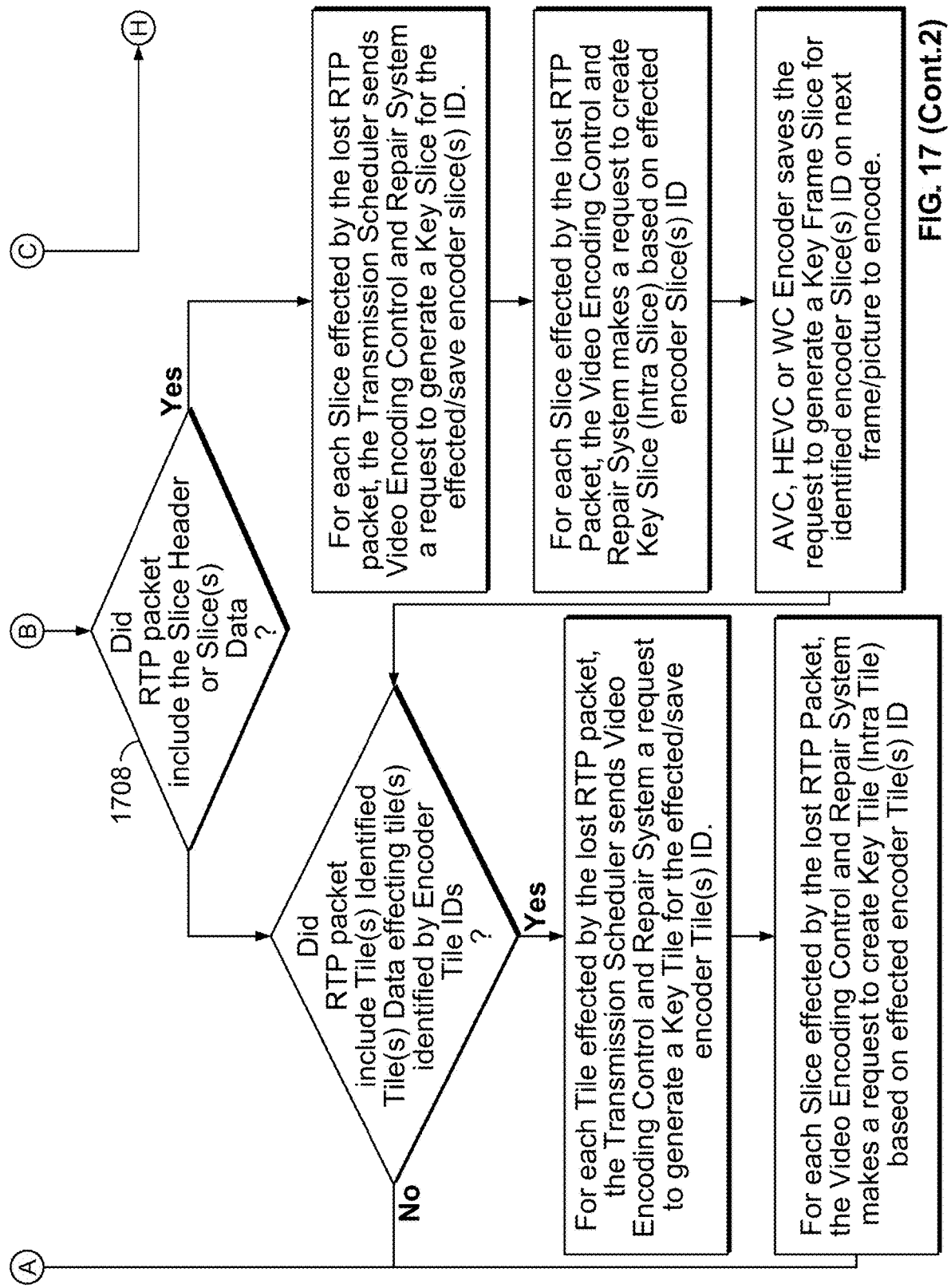
FIG. 17 (Cont.2)

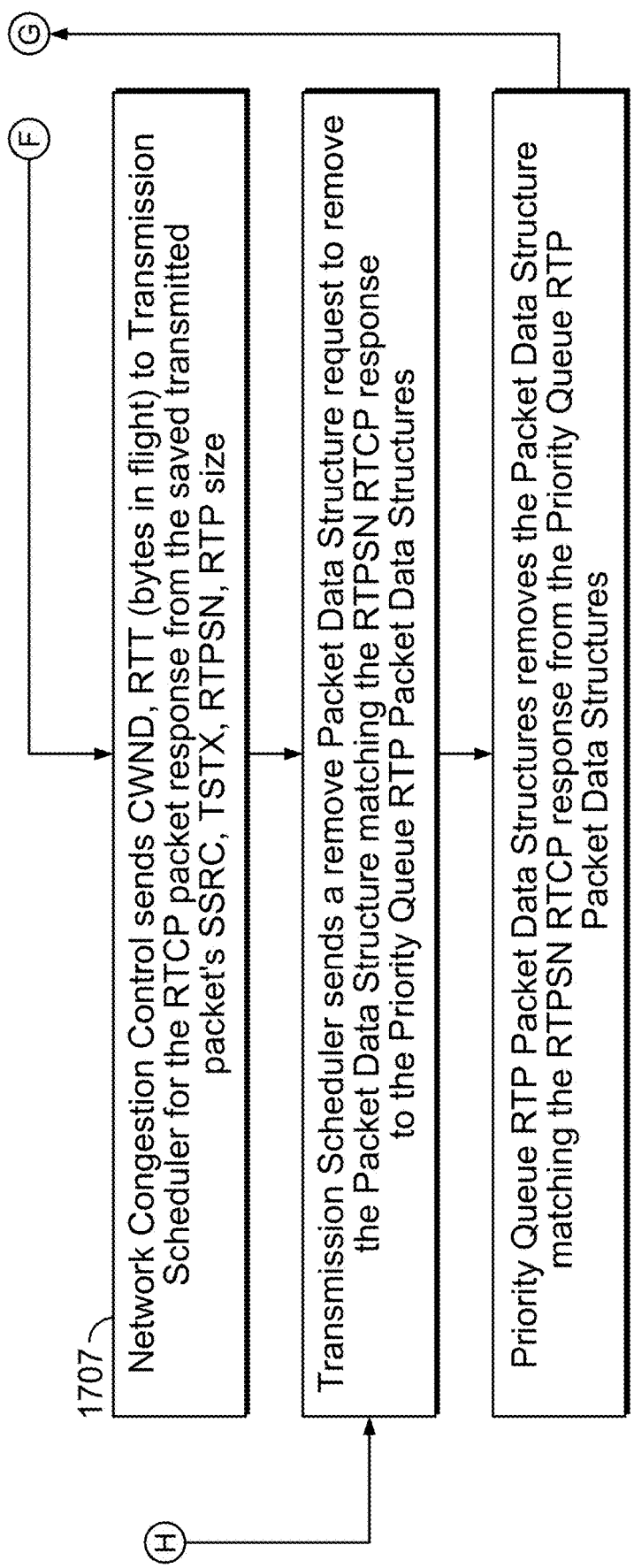
FIG. 17 (Cont.3)

OPTIMIZED FAST VIDEO FRAME REPAIR FOR EXTREME LOW LATENCY RTP DELIVERY

BACKGROUND

The present disclosure is directed towards systems and methods for repairing video frame delivery in a low latency environment. Systems and methods are provided herein for repairing a video frame when a packet was dropped or corrupted in a system with minimal to no buffer.

SUMMARY

Extreme low latency delivery is critical for cloud rendered content that is highly interactive, such as content in virtual reality (VR), augmented reality (AR), and extended reality (XR), including cloud rendered virtual reality VR applications, VR foveated rendering, cloud or remote rendered gaming, and many other cloud interactive applications. In these low latency cases, both the encoder and decoder run with virtually no buffer, meaning the frame is decoded and rendered as soon as all the packets for the frame have arrived at the client device.

When encoding a video, each frame is subject to a slice structure, where the frame is split into slices or tiles, which are sub-partitions of the frame. In some embodiments, each frame is encoded with one slide per frame such that the video is encoded at the frame level. In some embodiments, each frame is encoded with multiple slices per frame. In some embodiments, these slices are independently motion constrained. In some embodiments, the video is encoded with tiles, where tiles are self-contained rectangular regions of the picture. Slices are not limited to a rectangular shape. In some embodiments, tiles are sequences of coding tree units (CTUs) that cover a rectangular region of a picture, while slices are a whole number of complete tiles, or consecutive and complete CTU rows within a tile.

In a slice stream or tile stream containing data for a particular slice or tile location across multiple frames, the first slice or tile will be encoded as an intra-coded picture (I-slice) which encodes all information for the pixels contained within the slice. Subsequent slices and tiles within the slice or tiles stream may be encoded as either predicted slices (P-slices)/predicted tiles (P-tiles) or bidirectional predicted slices (B-slices)/bidirectional predicted tiles (B-tiles). P-slices and P-tiles encode only the changes from the previous slice or tile, which is either an I-slice/I-tile or another P-slice/P-tile. B-slices/B-tiles encode differences between the preceding slice/tile and the following slice/tile. In a low latency system, all pictures after the initial I-slice/I-tile will be predicted slices/tiles when the group of pictures is defined as IPPP, and the encoder is configured to only encode an I-slice/I-tile at the start of the video encoding. All pictures after the initial I-slice/I-tile will be either predicted slices/tiles or bi-directional slices/tiles when the group of pictures is defined as IBBP, and the encoder is configured to only encode an I-slice/I-tile at the start of the video encoding. Because of this dependent encoding structure, in the case that a data packet is dropped, the following packets will contain encoding dependent on the dropped packet, and therefore the following slices/tiles will experience macro blocking or corrupted video will be rendered to the end user.

In some systems, when packet loss occurs or packets do not arrive in time, the system has the option to retransmit the dropped or corrupted packet. This solution requires a buffer to contain frames yet to be displayed which can be used while the dropped or corrupted packet is retransmitted. However, in a low latency system with little to no buffer, the frames in the buffer will be exhausted before the frame is retransmitted and decoded. Therefore, re-transmitting the packet will result in the packet arriving too late for the slice to be displayed in time and result in a continuous corruption of all slices following the corrupted slice. There is need for a method of repairing a video stream when a video data packet is dropped in a low latency system which minimizes the impact on the displayed video.

Systems and methods are provided which, in response to a video data packet containing data for a slice in a slice stream being dropped or corrupted, modifies the encoding of the video to encode a subsequent slice that is to be encoded in the slice stream as an I-slice (e.g., even if it was otherwise to be encoded as an P-slice).

In a video stream encoded as IPPPPPPP, if a frame is lost, then all subsequent frames would become undecodable. By forcing a subsequent slice to be encoded as an I-slice, all subsequent slices will be able to be displayed as well.

In some embodiments, an encoder encodes a video with many frames using slice encoding. Slice encoding involves defining a slice structure for the video which includes a plurality of slices. Each slice in the slice structure contains pixel data for a particular location in each frame of the video, with the location of each slice remaining consistent across all frames of the video. For each slice defined by the slice structure, the encoder encodes a slice stream. The slice stream contains data for each frame in the video for the slice location. Within this slice stream, the slice data for each frame is encoded as either an I-slice or a P-slice.

In some approaches, the system then transmits data packets to a client device. Each data packet comprises encoded slice data for at least one slice of a particular frame. The encoder then receives feedback data from the client device indicating that the encoded data for the slice data for the slice of a particular frame was not received or was corrupted. In response to receiving this feedback data, the encoder modifies the encoding of the video such that a slice in a next frame to be encoded in the slice stream of the particular slice is an I-slice.

In some embodiments, in response to receiving the feedback data, the system refrains from retransmitting the particular data packet which was dropped.

In some embodiments, a direct connection is established between the encoder and the decoder executing at the client device. This direct connection is established as a separate connection in addition to the connection for transmitting the video from the encoder to the client device. The feedback data sent over this direction connection is an application programming interface (API) communication from the decoder to the encoder.

In some embodiments, the slice structure comprises a plurality of slices which are sub-partitions of each frame with pixel data for a non-rectangular region of each frame. In some embodiments, each slice is a tile which comprises pixel data for a rectangular region of each frame.

In some embodiments, a packetized elementary stream (PES) is assembled for each frame of the video. The PES packet contains data for all slices of the frame. In some embodiments, this PES packet is multiplexed into multiple real-time transport protocol (RTP) packets. Each RTP packet contains data for a subset of the slices within the frame. In some embodiments, the slices multiplexed into each RTP data packet are located directly next to each other. In some embodiments, the slices multiplexed into each RTP data packet are chosen randomly.

In some embodiments, the system stores a data structure which contains, for each RTP data packet, an RTP sequence number, identification of slices which were multiplexed into the RTP data packet, and a sequence number of the frame the slices are sub-partitions of. In some embodiments, when the feedback is received, it contains the RTP sequence number of the data packet which was dropped or corrupted. This RTP sequence number can be cross-referenced with the stored data structure to identify what slices were dropped or corrupted.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 15 shows a flowchart of illustrative steps involved in transmitting repair packets for a dropped or corrupted packet, in accordance with some embodiments of the present disclosure;

FIG. 16 shows a flowchart of illustrative steps involved in transmitting slice or tile data using an RTP data packets, in accordance with some embodiments of the present disclosure.

DETAILED DESCRIPTION

Figure 1A:
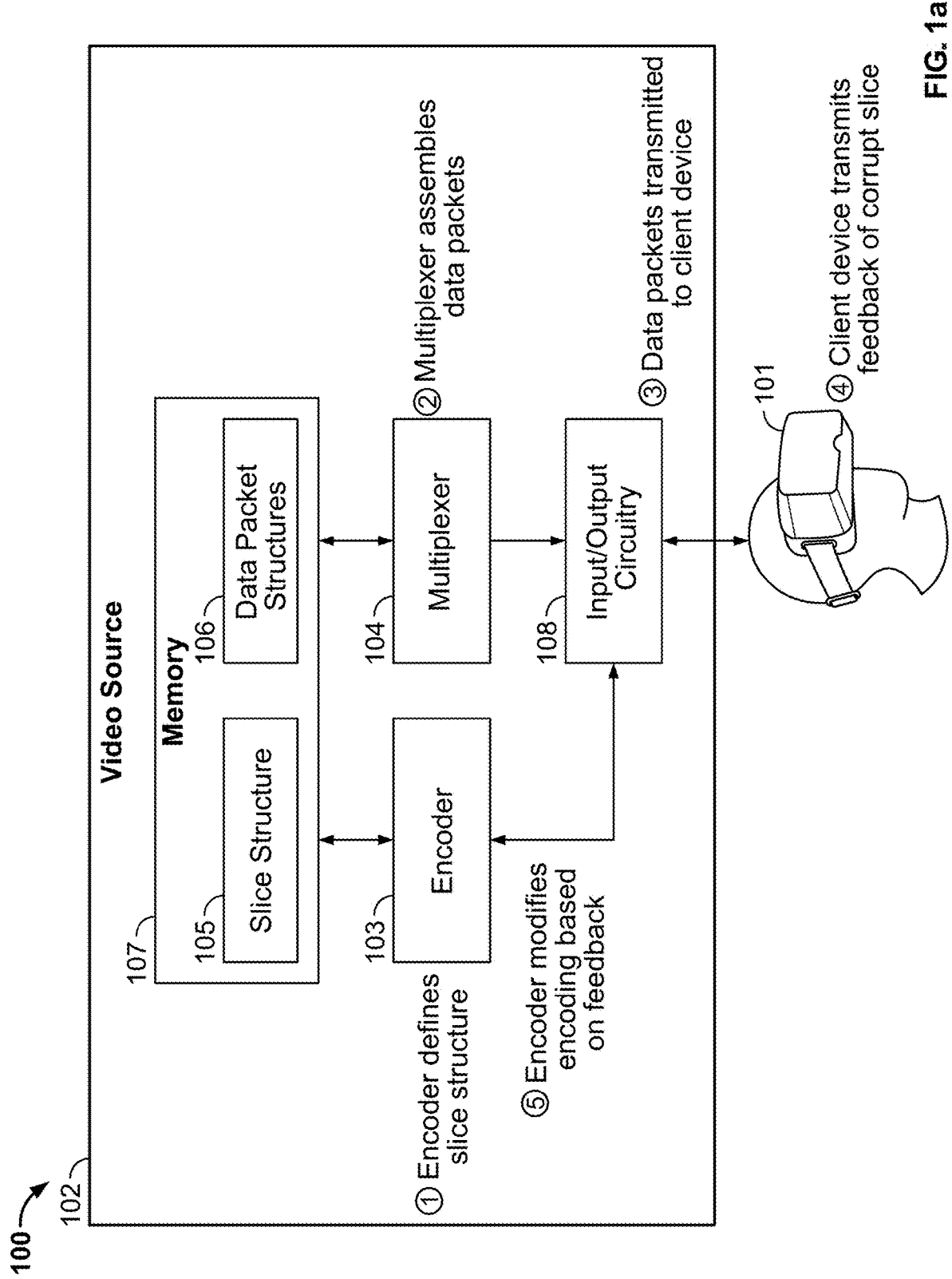
FIG. 1a shows a block diagram representing a system for transmitting packets of video data from a video source to a client device in a low latency system, in accordance with some embodiments of the disclosure.

FIG. 1a shows a block diagram representing system 100 for transmitting packets of video data for a video from video source 102 to client device 101 in a low latency system, in accordance with some embodiments of the disclosure. In some embodiments, client device 101 is a device for running low-latency content. For example, client device 101 is a VR headset, a gaming device which renders cloud gaming, or any other device for low-latency content. In some embodiments, client device 101 is user device 1200 of FIG. 12. In some embodiments, client device 101 is user equipment 1307 of FIG. 13. In some embodiments, client device 101 is user device 1308 of FIG. 13. In some embodiments, client device 101 is user equipment 1310 of FIG. 13. In some embodiments, video source 102 is server 1304 of FIG. 13. In some embodiments, video source 102 is media content source 1302 of FIG. 13.

In some embodiments, video source 102 contains encoder 103, multiplexer 104, memory 107, and input/output circuitry 108. In some embodiments, encoder 103 is a portion of control circuitry 1311 of FIG. 13. In some embodiments, encoder 103 may be implemented as a software at the video source 102. In some embodiments, multiplexer 104 is a portion of control circuitry 1311 of FIG. 13. In some embodiments, multiplexer 104 may be implemented as a software at the video source 102. In some embodiments, encoder 103 is input/output (I/O) path 1312 of FIG. 13. In some embodiments, encoder 103 is communication network 1307 of FIG. 13. In some embodiments, memory 105 is storage 1314 of FIG. 13.

At step 1, encoder 103 encodes the video by defining a slice or tile structure 105 for the video and stores slice or tile structure 105 in memory 105. Encoder 103 defines slice or tile structure 105 which divides each frame of the video into multiple slices or tiles which are sub-partitions of the frame. For example, a video may be subject to a tile structure where each frame is divided into four rectangular regions of the screen. Slice or tile structure 105 can be stored by encoder 103 or memory 107. Encoder 103 transmits information for slice or tile structure 105 to multiplexer 104.

In some approaches, at step 2, multiplexer 104 assembles data packet structures 106 using slice or tile structure 105. Each data packet structure assembled by multiplexer 104 contains information for a portion of a frame. For example, a data packet may include data for a single slice of the frame or for multiple slices or tiles from the frame. Multiplexer 104 stores the data packet structures 106 in memory 107. Multiplexer 104 then transmits data packet structures 106 to input/output circuitry 108. At step 3, input/output circuitry 108 transmits the video data packets to client device 101.

In some embodiments, client device 101 determines that one of the video data packets was corrupted or not received. At step 4, client device 101 transmits feedback that the data packet was corrupted or not received to video source 102. Input/output circuitry 108 receives the feedback from the client device and informs encoder 103. At step 5, encoder 103 modifies the encoding of the video in response to the feedback from client device 101.

Figure 1B:
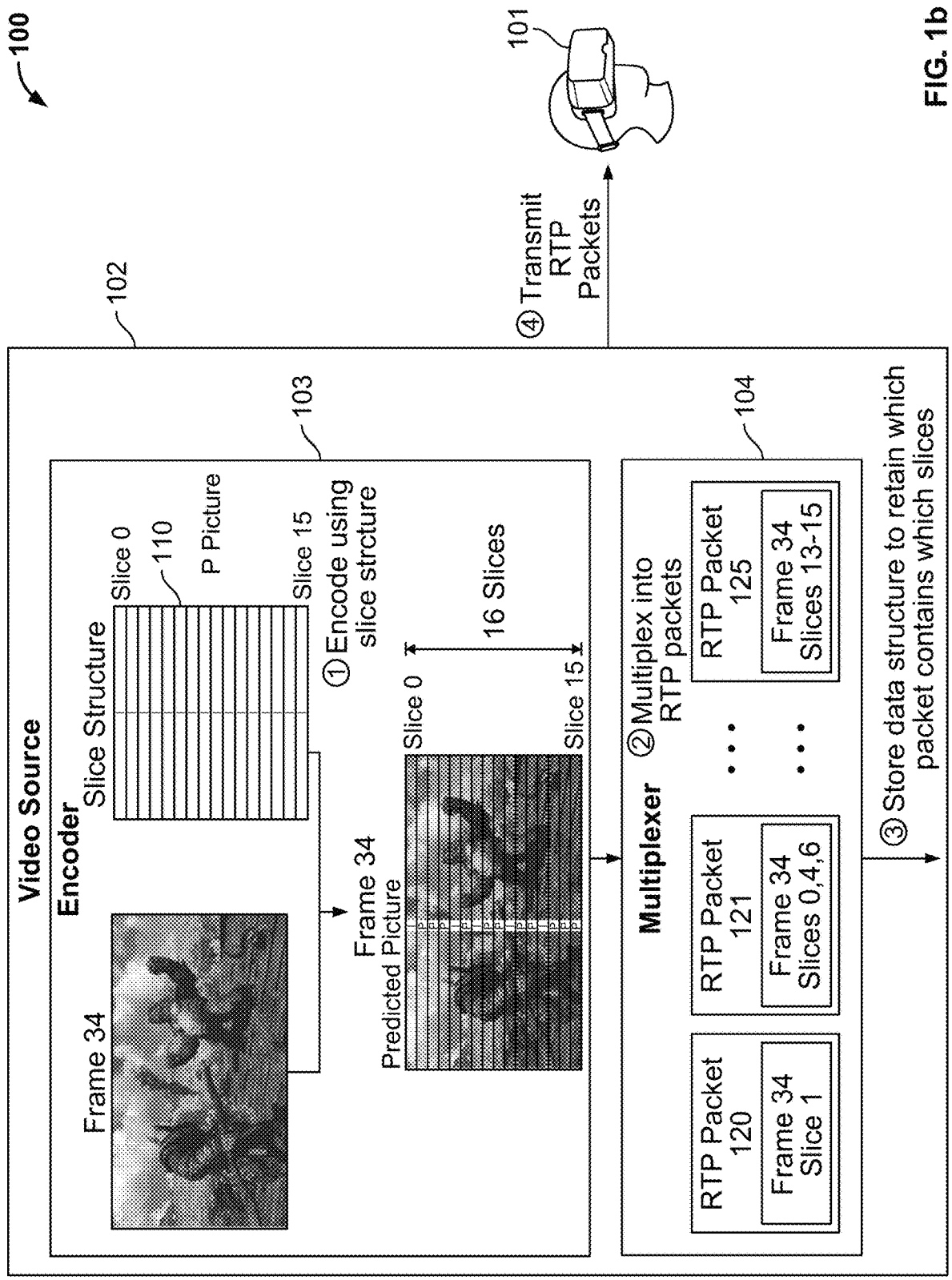
FIG. 1b shows a block diagram representing a system for encoding a video and multiplexing the slice data into video data packets to transmit to a client device in a low latency system, in accordance with some embodiments of the disclosure.

FIG. 1b shows a block diagram representing system 100 for encoding a video and multiplexing the slice data into video data packets to transmit to client device 101 in a low latency system, in accordance with some embodiments of the disclosure.

In some embodiments, video source 102 containing encoder 103 and multiplexer 104 encodes a video for client device 101. Encoder 103 defines a slice structure for the video which divides up each frame of the video into slices. For example, at step 1, frame 34 of the video is divided by encoder 103 using slice structure 110. Slice structure 110 divides frame 34 into 16 slices numbered slice 0 through slice 15. Encoder 103 transmits data for each slice of frame 34 with multiplexer 104.

In some embodiments, at step 2, multiplexer 104 multiplexes the slice data for frame 34 into real-time transport protocol (RTP) packets. For example, RTP packet 120 contains data for slice 1 of frame 34. RTP packet 121 contains data for slices 0, 4, and 6 of frame 34. The rest of the slices of frame 34 are multiplexed into RTP packets, ending with RTP packet 125 which contains data for slices 13, 14, and 15 of frame 34. At step 3, multiplexer 104 stores a data structure which represents what slice data each RTP packet contains. At step 4, video source 102 transmits each of the RTP packets to client device 101.

Figure 1C:
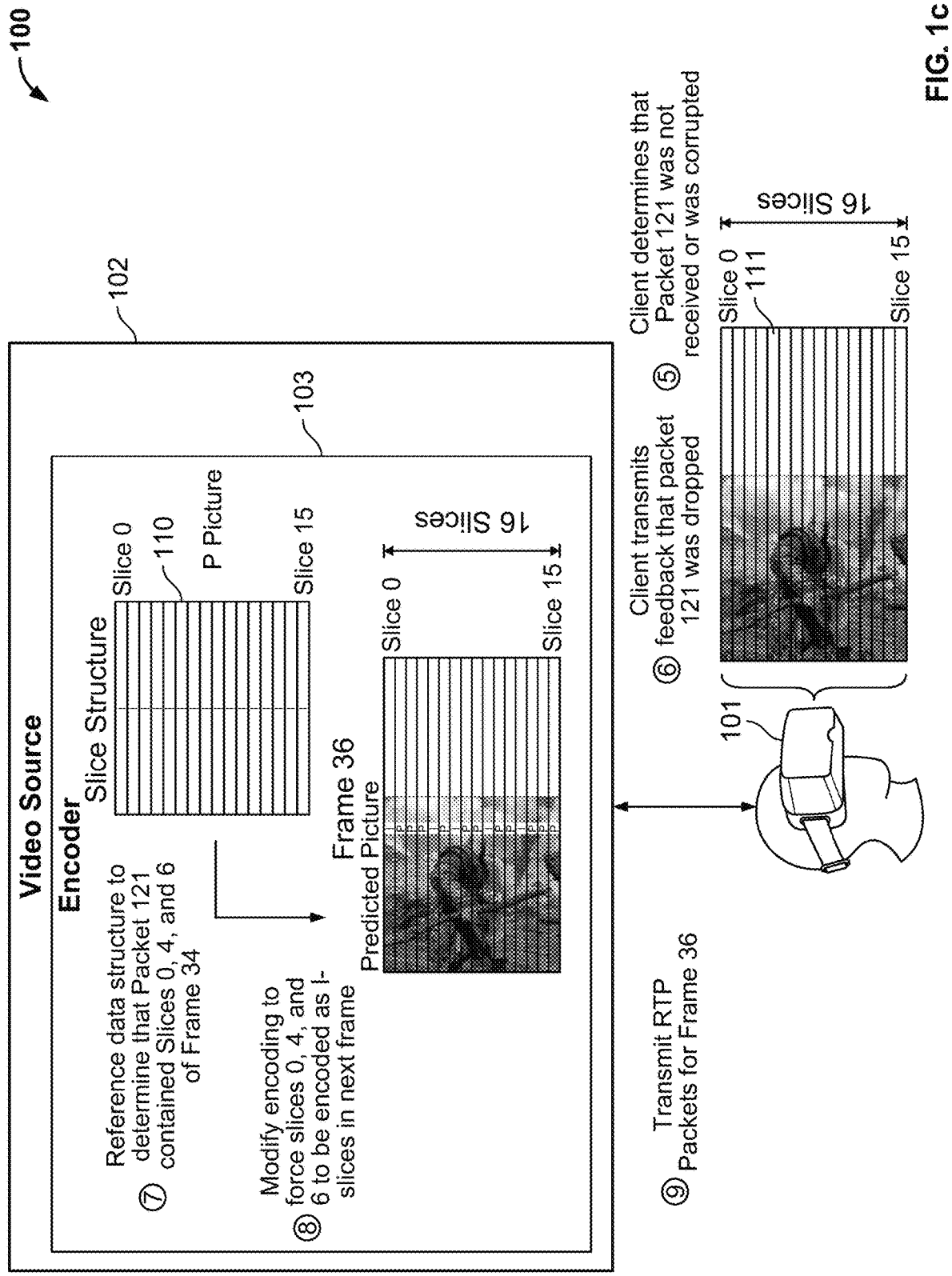
FIG. 1c shows a block diagram representing a system for modifying the encoding for a video in response to feedback that a video data packet was dropped or corrupted, in accordance with some embodiments of the disclosure.

FIG. 1c shows a block diagram representing system 100 for modifying the encoding for a video in response to feedback by client device 101 that a video data packet was dropped or corrupted, in accordance with some embodiments of the disclosure.

In some embodiments, at step 5, client device 101 determines that RTP packet 121 was not received or corrupted. Since system 100 is a low-latency system with little to no buffer, client device 101 displays to the user display 111 which is frame 34 with the slices contained by packet 121 corrupted or missing. This dropped packet will impact future encoding within the slice stream of the slices within RTP packet 121 if the slices are encoded by encoder 103 as P-slices, since the data the P-slice depends on is corrupted or missing. At step 6, client device 101 transmits feedback to video source 102 that packet 121 was dropped or corrupted. In some embodiments, each slice stream may include slices or tiles.

In some embodiments, at step 7, control circuitry references the stored data structure to determine that RTP packet 121 contained slices 0, 4, and 6 of frame 34. In some embodiments, a decoder at client device 101 informs the encoder directly to regenerate a particular slice. In some embodiments, an RTP packet transmission scheduler receives a retransmit request. In some embodiments, the transmission scheduler is transmission scheduler 808 of FIG. 8. If it is a video packet, the transmission scheduler, based on the data structure of slices effected will make a request to encoder 103 to generate intra slice(s) for those effected by the packet loss. At step 8, encoder 103 modifies the encoding to force slices 0, 4, and 6 to be encoded as I-slices for subsequent frame 36. At step 9, video source 102 transmits RTP packets for frame 36 to client device 101.

Figure 2:
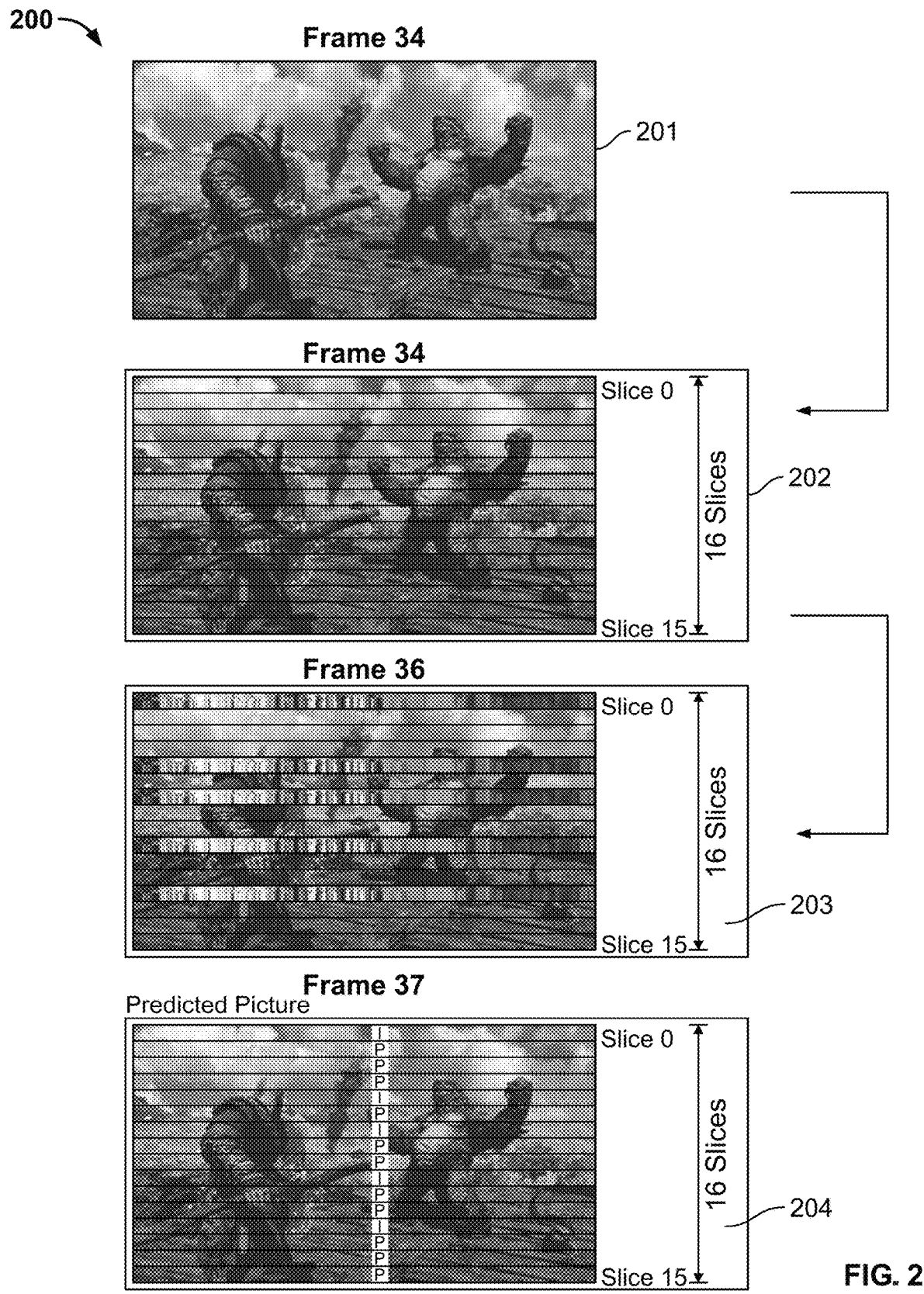
FIG. 2 shows a block diagram representing a system for defining a slice structure for a frame of a video, in accordance with some embodiments of the disclosure.

FIG. 2 shows a block diagram representing system 200 for defining a slice structure for a frame of a video, in accordance with some embodiments of the disclosure.

For example, frame 201 is frame 34 of a video to be encoded and delivered to a user device. All packets containing data for frame 34 must arrive at the user device in time to be displayed together. The single frame 34 is divided into independent encoded slices. In some embodiments, the frame is encoded using e.g., the advanced video coding (AVC). Slice encoded frame 202 shows frame 34 subject to a slice encoding with 16 slices. Some slice encoding may encode a frame with up to 32 slices. Each slice of the slice encoding is independently encoded from the other slices of the frame. Therefore, no slice in a frame depends on any other slice in the frame. In some embodiments, each slice may be the same size (e.g. represent a same number of pixels of the full frame). In some embodiments, slices may vary in size (e.g. represent a different number of pixels of the full frame). Slice encoded frame 202 shows a slice structure with rectangular shaped slices.

When transmitting data packets containing slices of frame 34, some data packets may be lost or corrupted. When display frame 203 for a subsequent frame 36 of the video is displayed on a user device when data packets containing data for frame 34 have been lost or corrupted, the display for frame 36 may show distortions at certain slices. Macroblocking is a distortion which displays as abnormally large pixel blocks. Distortion may occur because data for the previous slice from frame 34 in the slice stream was dropped and the current slice from frame 36 in the slice stream was encoded as a P-slice which depended on the lost or corrupted slice from frame 34. Since this slice encoding depended on the previous frame, the decoding results in a distorted image.

For example, display frame 203 of frame 36 shows macroblocking in slices 0, 4, 6, 9, and 12. This distortion may have occurred because a single data packet containing data for slices 0, 4, 6, 9, and 12 in frame 36 was dropped or corrupted. This distortion may have occurred because multiple data packets were dropped or corrupted. For example, a data packet containing data for slices 0, 4, and 6 and another data packet containing data for slices 9 and 12 may have both been dropped or corrupted.

Subsequent slice encoded frame 204 shows frame 37 subject to a slice encoding with 16 slices. Each slice is encoded as a P-slice dependent on previous slices in the slice streams, except for slices 0, 4, 6, 9, and 12. The encoding for slices 0, 4, 6, 9, and 12 of frame 37 has been modified in response to the video source receiving feedback that the data packets containing slices 0, 4, 6, 9, and 12 of frame 34 were lost. Now, slices 0, 4, 6, 9, and 12 for frame 37 are encoded as I-slices.

Figure 3:
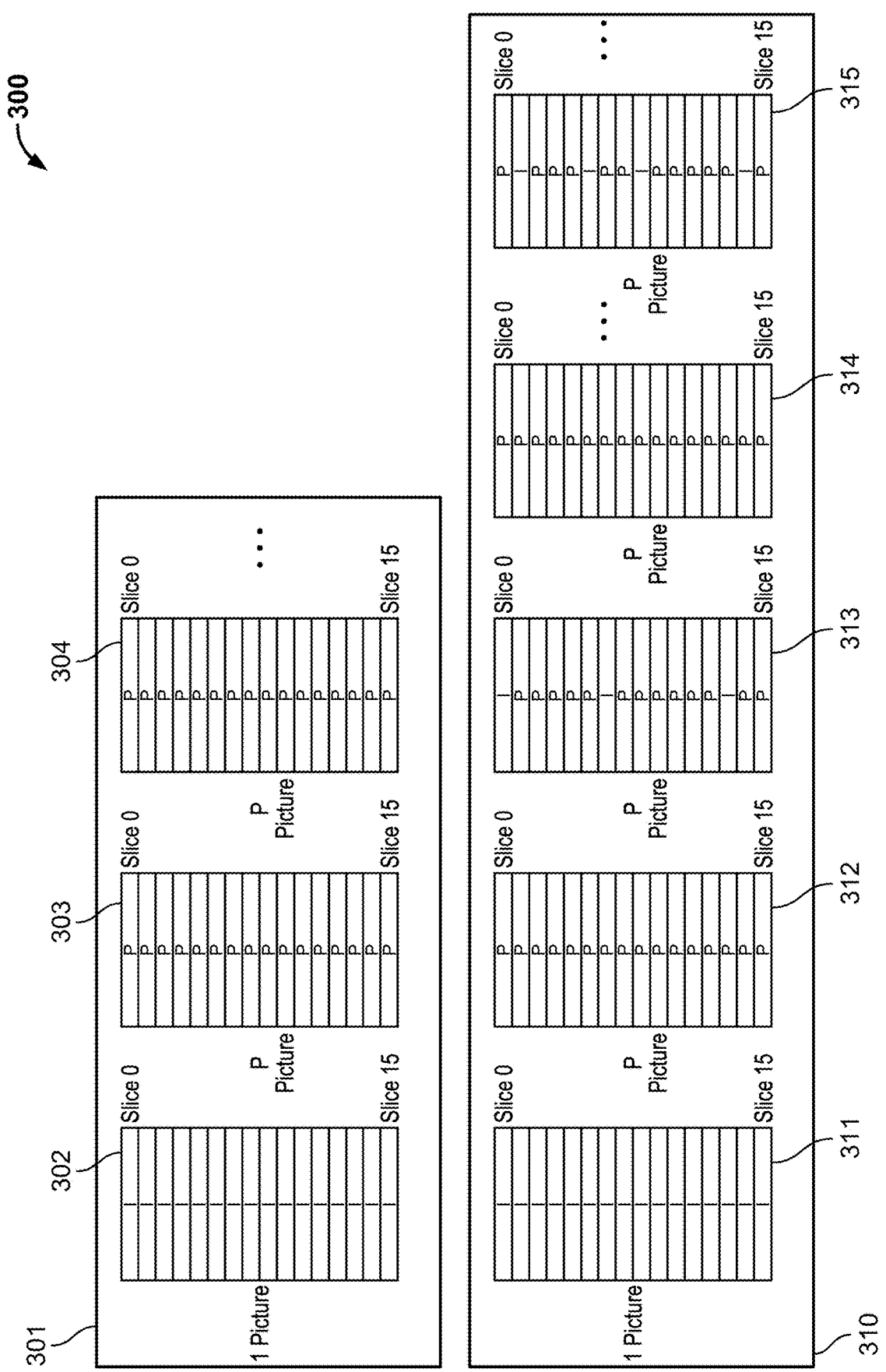
FIG. 3 shows a block diagram representing a system for encoding a slice structure encoding for a frame of a video, in accordance with some embodiments of the disclosure.

FIG. 3 shows a block diagram representing system 300 for encoding a slice structure encoding for a frame of a video, in accordance with some embodiments of the disclosure.

In some embodiments, slice stream 301 represents a typical slice stream encoding with no packet loss or corruption. The video is subject to a slice structure with 16 slices. All slices in frame 302 are encoded as I-slices. Subsequent frames 303 and 304 are each encoded entirely with P-slices.

In some embodiments, slice stream 310 represents a slice stream encoding with packet loss or corruption and modified encoding to correct the distortion. The video is subject to a slice structure with 16 slices. For example, all slices in frame 311 are encoded as I-slices. Subsequent frame 312 is encoded entirely with P-slices. However, a data packet containing encoding for slices 0, 6, and 13 of frame 312 is not received by the client device or is corrupted. Therefore, the video source modifies the encoding for frame 313 such that slices 0, 6, and 13 are encoded as I-slices while the other slices which were not lost or corrupted continue to be encoded as P-slices. After this correction, subsequent frame 314 is encoded entirely with P-slices. Subsequent frame 315 is encoded with a mixture of I-slices and P-slices. Frame 314 may be encoded with this mixture of I-slices and P-slices in response to another packet loss or corruption. B-slices may also be included in this slice stream.

Figure 4:
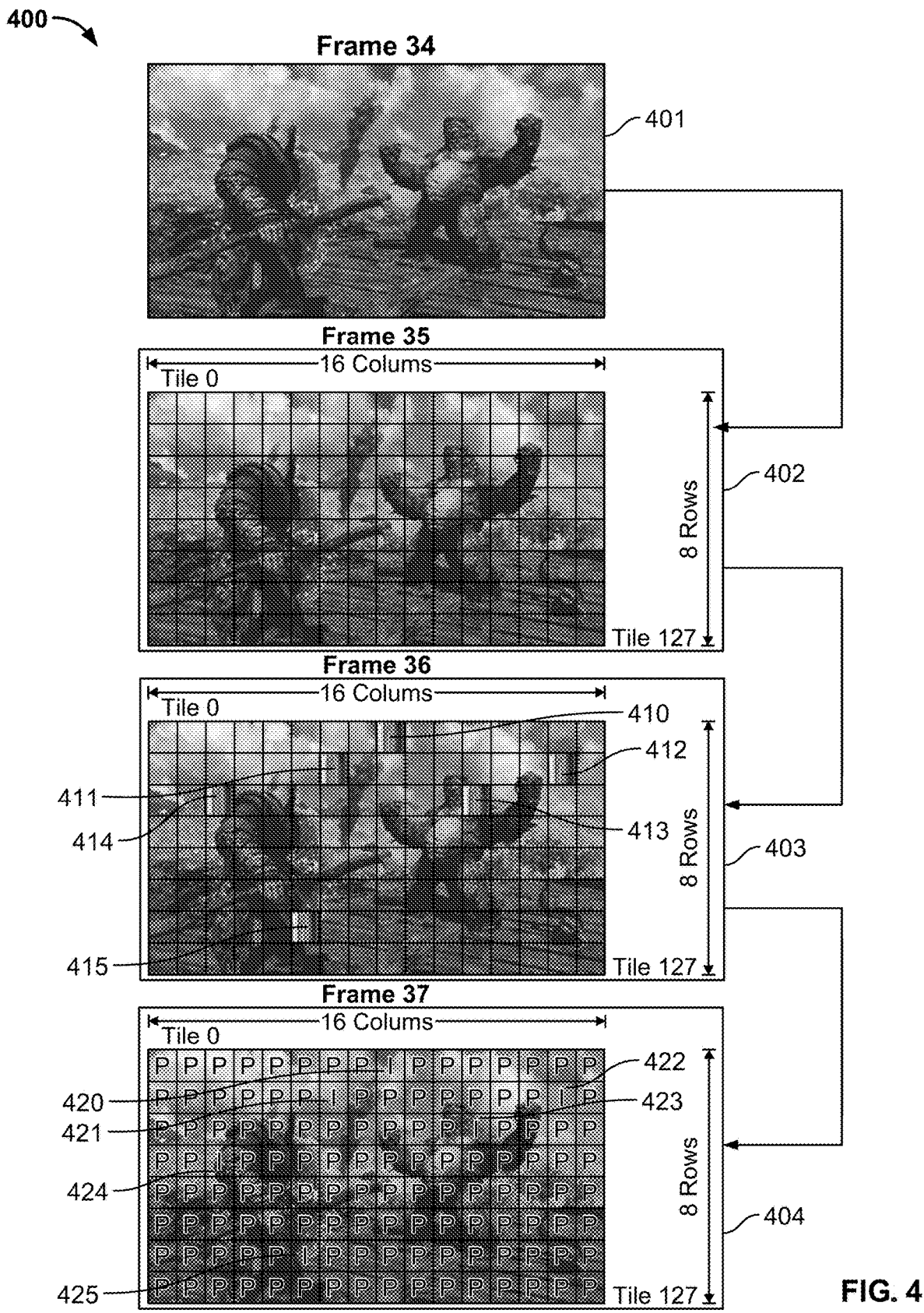
FIG. 4 shows a block diagram representing a system for defining a slice structure with tiles for a frame of a video, in accordance with some embodiments of the disclosure.

FIG. 4 shows a block diagram representing a system for defining a tile structure for a frame of a video, in accordance with some embodiments of the disclosure. In some embodiments, each tile may be a square. In some embodiments, each tile may be an irregular shape.

For example, frame 401 is frame 34 of a video to be encoded and delivered to a user device. All packets containing data for frame 34 must arrive at the user device in time to be displayed together. The single frame 34 is divided into independently encoded tiles. In some embodiments, the frame is encoded using versatile video coding (VVC) or high efficiency video coding (HEVC). Tile encoded frame 402 shows frame 34 subject to a tile encoding with 128 tiles arranged in 16 columns and 8 rows. In some embodiments, encoding with tiles may have more or less rows or columns.

When transmitting data packets containing slices of frame 34, some data packets may be lost or corrupted. For example, when display frame 403 for a subsequent frame 36 of the video is displayed on a user device when data packets containing data for frame 34 have been lost or corrupted, the display for frame 36 may show distortions at certain tiles. Macroblocking is a distortion which displays as abnormally large pixel blocks. Distortion may occur because data for the previous tile from frame 34 in the tile stream was dropped and the current tile from frame 36 in the tile stream was encoded as a P-tile which depended on the lost or corrupted tile from frame 34. Since this tile encoding depended on the previous frame, the decoding results in a distorted image.

Display frame 403 of frame 36 shows macroblocking in tiles 410, 411, 412, 413, 414, and 415. This distortion may have occurred because a single data packet containing data for tiles 410, 411, 412, 413, 414, and 415 was dropped or corrupted. This distortion may have occurred because multiple data packets were dropped or corrupted. For example, a data packet containing data for tiles 410, 411, and 412 and another data packet containing data for tiles 413, 414, and 415 may have both been dropped or corrupted.

Subsequent tile encoded frame 404 shows frame 37 subject to a tile encoding with 128 tiles. Each tile is encoded as a P-tile dependent on previous tiles in the tile streams, except for tiles 410, 411, 412, 413, 414, and 415. The encoding for tiles 410, 411, 412, 413, 414, and 415 of frame 37 has been modified in response to the video source receiving feedback that the data packets containing tiles 410, 411, 412, 413, 414, and 415 of frame 34 were lost. Now, tiles 410, 411, 412, 413, 414, and 415 for frame 37 are encoded as I-tiles.

Figure 5:
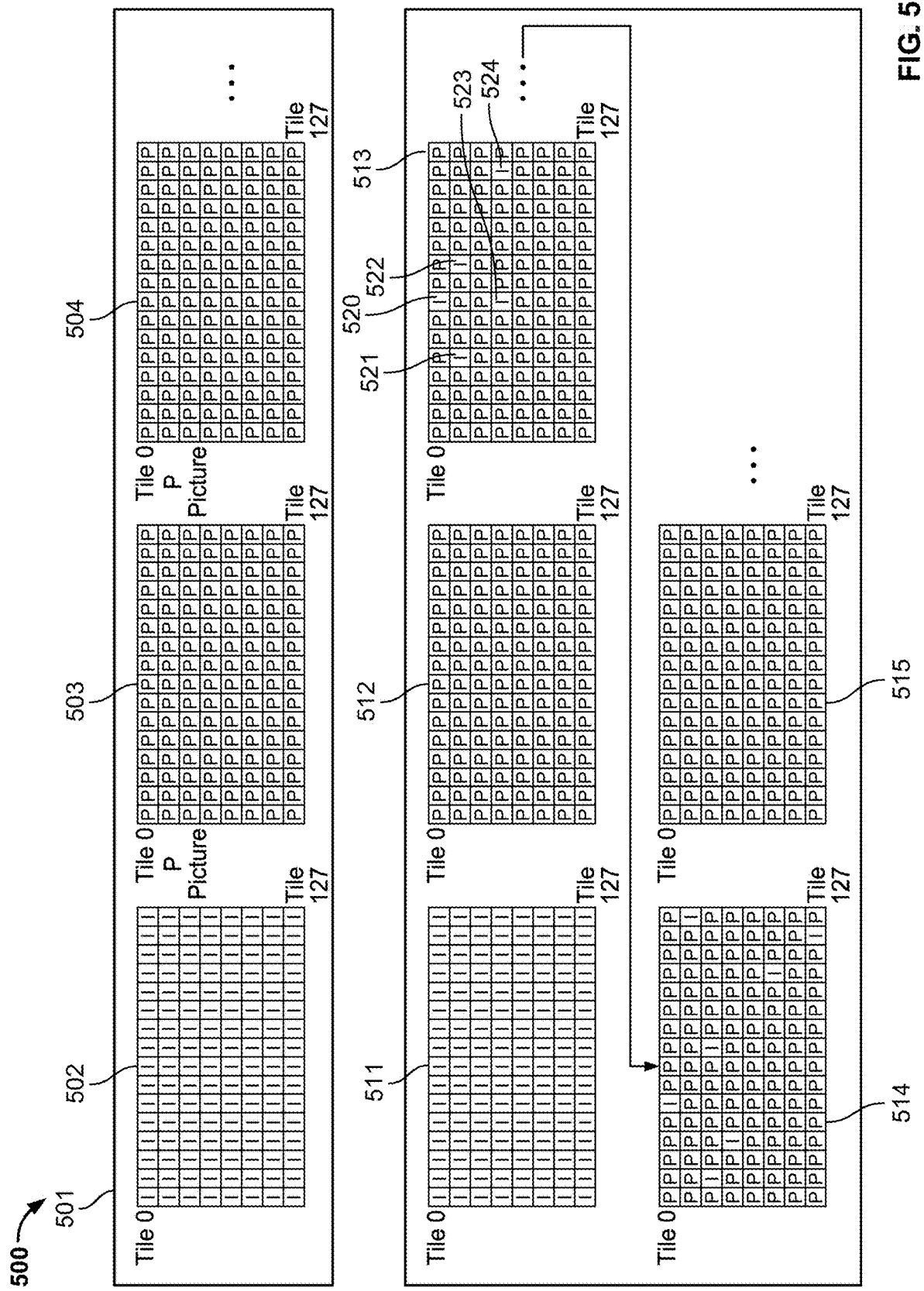
FIG. 5 shows a block diagram representing a system for encoding a tile structure encoding with tiles for a frame of a video, in accordance with some embodiments of the disclosure.

FIG. 5 shows a block diagram representing a system for encoding a tile structure encoding with tiles for a frame of a video, in accordance with some embodiments of the disclosure.

Tile stream 501 represents a typical tile stream encoding with no packet loss or corruption. The video is subject to a tile structure with 128 tiles. All tiles in frame 502 are encoded as I-tiles. Subsequent frames 503 and 504 are each encoded entirely with P-tiles.

Tile stream 510 represents a tile stream encoding with packet loss or corruption and modified encoding to correct the distortion. The video is subject to a tile structure with 128 tiles. All tiles in frame 511 are encoded as I-tiles. Subsequent frame 512 is encoded entirely with P-tiles. However, a data packet containing encoding for tiles 520, 521 522, 523, and 524 of frame 512 is not received by the client device or is corrupted. Therefore, the video source modifies the encoding for frame 513 such that tiles 520, 521 522, 523, and 524 are encoded as I-tiles while the other tiles which were not lost or corrupted continue to be encoded as P-tiles. Subsequent frame 514 is encoded with a mixture of I-tiles and P-tiles. Frame 514 may be encoded with this mixture of I-tiles and P-tiles in response to another packet loss or corruption. After this correction, subsequent frame 515 is encoded entirely with P-tiles. B-tiles may also be included in this slice stream.

Figure 6:
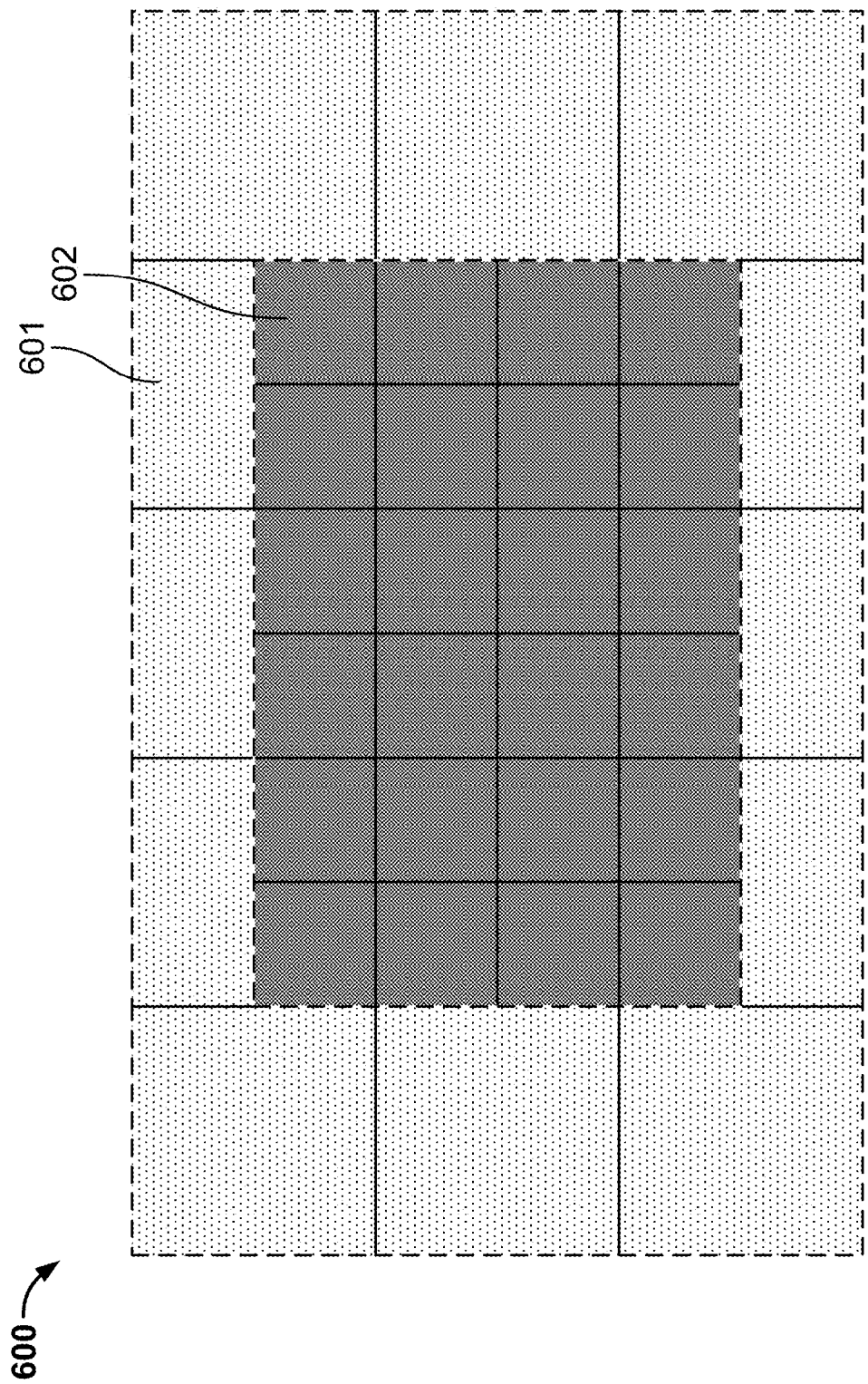
FIG. 6 shows a block diagram representing defining a tile structure of a frame of a video, in accordance with some embodiments of the disclosure.

FIG. 6 shows a block diagram representing defining a tile structure 600 of a frame of a video, in accordance with some embodiments of the disclosure.

When defining a tile structure for the video, the portions of each frame comprise independently decodable portions of the frame. This independent slice encoding is supported by advanced video coding (AVC), high efficiency video coding (HEVC), and versatile video coding (VVC). These portions may be slices. This independent tile encoding is supported by high efficiency video coding (HEVC), and versatile video coding (VVC). These portions may be tiles. Tiles are self-contained rectangular regions of the picture. Slices are arranged in rows while tiles may be in columns and rows.

To facilitate the detection of missing tiles due to packet loss, the encoder and decoder can be configured to support a mode of tiling where the tile information can be easily obtained. In some embodiments, tile structure may be defined by tile encapsulated tiling where each tile is a self-contained picture, which is independently decodable. The benefit in such a tiling mode is that the slice headers do not have to align. In other words, each slice header corresponds to specific tiles so that the identification of the tile becomes straightforward.

Slice structure 600 shows an example of a partitioning of a picture. Tile 601 is a portion of the frame encapsulated by subpictures, including subpicture 602, which are independently decodable. Subpicture 602 is a subpicture for the purpose of eliminating inter-prediction across subpicture boundaries. Defining the subpicture structure in this way allows for expedited repair of lost or corrupted subpictures close to the center of the picture, which the user typically looks at more. The surrounding tiles or subpictures on the edge of the picture can also have a lower priority in picture quality.

Figure 7:
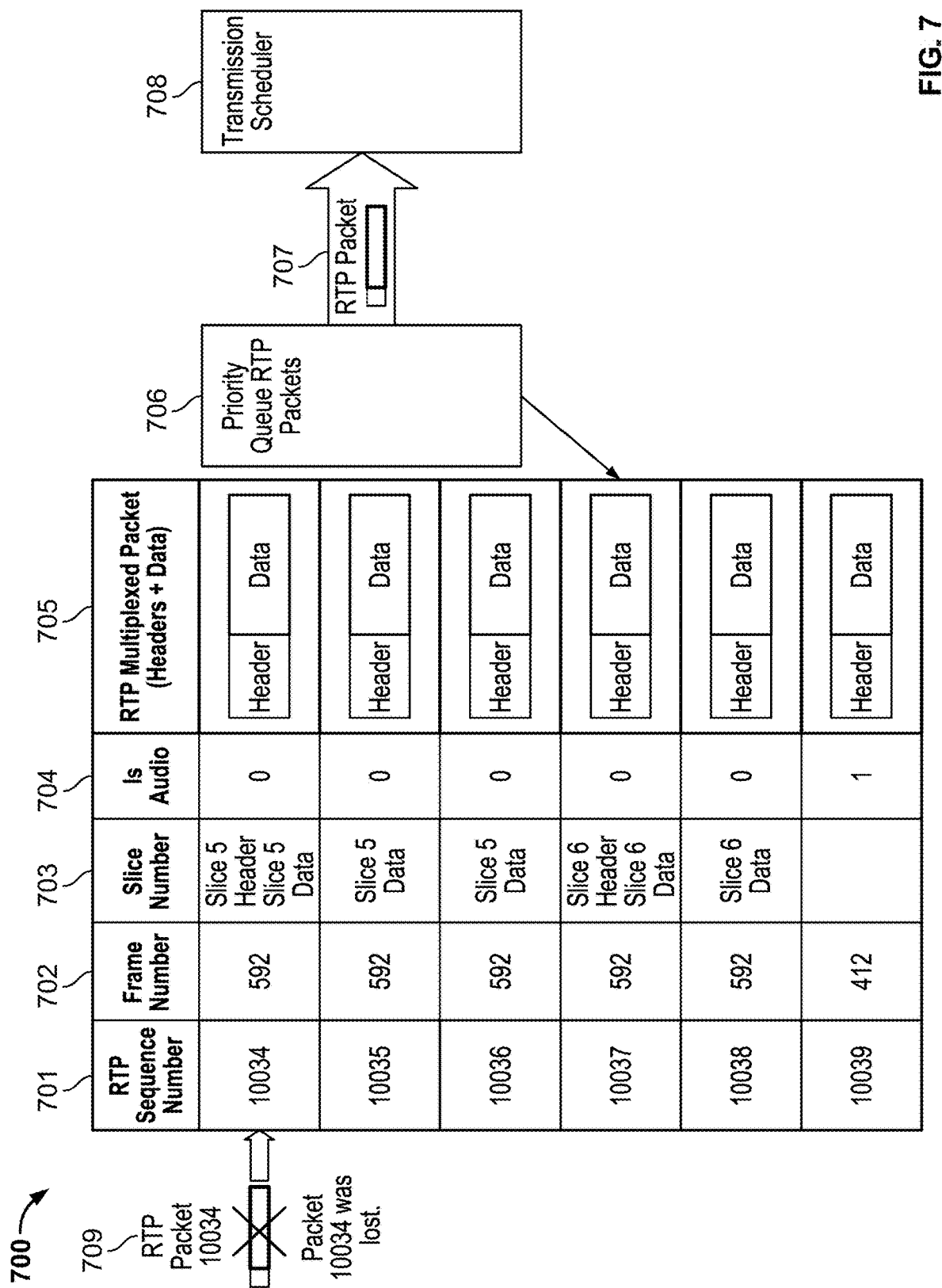
FIG. 7 shows a block diagram representing a data structure which stores RTP data packet information for a slice encoded video, in accordance with some embodiments of the disclosure.

FIG. 7 shows a block diagram representing a data structure which stores RTP data packet information for a slice encoded video, in accordance with some embodiments of the disclosure.

Data structure 700 comprises information used for determining how to re-encode a slice in a slice encoded video stream due to lost or corrupted data packets. Each entry of data in data structure 700 stores RTP sequence number 701, frame number 702, slice number 703, data type 704, and RTP multiplexed packet 705.

RTP sequence number 701 indicates the sequence number of the RTP packet that the data entry of the data structure corresponds to. Frame number 702 indicates the number of the frame in the video which the data entry of the data structure stores data for. Slice number 703 indicates which slices of frame number 702 are encoded in the RTP data packet. In some embodiments, each RTP packet may encapsulate only one slice of the frame. For example, the data entry of data structure 700 corresponding to RTP sequence number 10035 encapsulates data for slice number 5 of frame 592. In some embodiments, each RTP packet may encapsulate multiple slices of the frame. In some embodiments, each RTP packet may encapsulate only slice data. For example, the data entry of data structure 700 corresponding to RTP sequence number 10035 encapsulates only data for slice number 5 of frame 592. In some embodiments, each RTP packet may encapsulate slice data and header data. For example, the data entry of data structure 700 corresponding to RTP sequence number 10034 encapsulates data for slice number 5 of frame 592 and header data for slice 5 of frame 592. Data type 704 indicates whether the data encapsulated corresponds to audio data. In some embodiments, audio data may correspond to multiple frames. For example, the data entry of data structure 700 corresponding to RTP sequence number 10039 encapsulates audio data. Audio data is not slice encoded, so the data entry of data structure 700 corresponding to RTP sequence number 10039 does not indicate a slice number 703. RTP multiplexed packet 705 contains header and data for the information encoded for RTP sequence number 701.

When a client device indicates that a data packet was lost or corrupted by requesting a retransmit of that packet via an RTCP request, the data structure 700 can be referenced to determine what data was in the packet. For example, the Network Congestion Control receives RTCP feedback 709 indicating that RTP data packet 10034 was lost. The Network Controller sends a retransmit request to a Transmission Scheduler to retransmit the corrupt or lost packet. The Transmission Scheduler determines if that packet encapsulated audio or video. If it is video, then the Transmission Scheduler references data structure 700 to determine that RTP data packet 10034 contains data for slice 5 header and Slice 5 data of frame number 592. A request is then made to the encoder to encode the information contained by RTP data packet, slice 5 as an I-slice. All following slices are then encoded as P-slices. If the packet was an audio data packet which encapsulated audio data, the audio data packet is retransmitted.

Priority queue RTP packets 706 determines the priority for encoded RTP data packets and the order of transmission based on RTP sequence number. The encoder will encode slice 5 as an I-slice and multiplex the data into new RTP data packet 707.

In some embodiments, a packetized elementary stream (PES) is assembled for each frame of the video. In some embodiments, the PES packet contains data for all slices of the frame. In some embodiments, multiple PES packets may be used to contain data for all slices in a frame for very large pictures. In some embodiments, this PES packet is multiplexed into multiple real-time transport protocol (RTP) packets. Each RTP packet contains data for a subset of the slices within the frame. In some embodiments, the slices multiplexed into each RTP data packet are located directly next to each other. In some embodiments, the slices multiplexed into each RTP data packet are chosen randomly.

Figure 8:
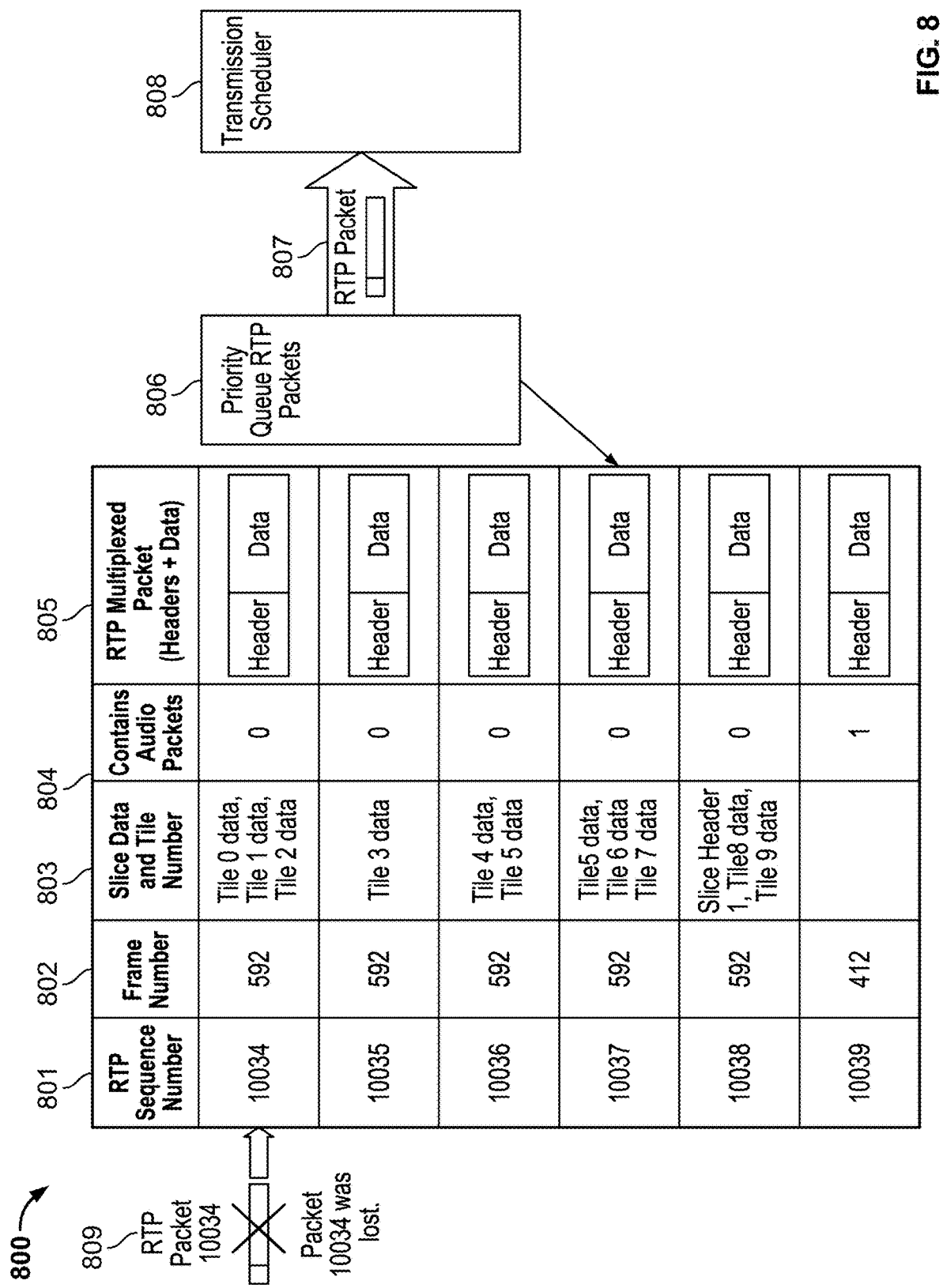
FIG. 8 shows a block diagram representing a data structure which stores RTP data packet information for a tile encoded video, in accordance with some embodiments of the disclosure.

FIG. 8 shows a block diagram representing a data structure which stores RTP data packet information for slice headers and tiles in encoded video, in accordance with some embodiments of the disclosure.

Data structure 800 comprises information used for determining how to re-encode a lost or corrupted data packet in a tiled encoded video stream. Each entry of data in data structure 800 stores RTP sequence number 801, frame number 802, slice header and tile data 803, data type 804, and RTP multiplexed packet 805.

RTP sequence number 801 indicates the sequence number of the RTP packet that the data entry of the data structure corresponds to. Frame number 802 indicates the number of the frame in the video which the data entry of the data structure stores data for. Slice header and tile data 803 indicates which slice headers and tiles of frame number 802 are encoded in the RTP data packet. In some embodiments, each RTP may encapsulate only one tile of the frame. For example, the data entry of data structure 800 corresponding to RTP sequence number 10035 encapsulates data for tile number 3 of frame 592. In some embodiments, each RTP packet may encapsulate multiple tiles of the frame. In some embodiments, each RTP packet may encapsulate only tile data for one tile. For example, the data entry of data structure 800 corresponding to RTP sequence number 10035 encapsulates only data for tile number 3 of frame 592. In some embodiments, each RTP packet may encapsulate only tile data for multiple tiles. For example, the data entry of data structure 800 corresponding to RTP sequence number 10034 encapsulates data for tile number 0, 1, and 2 of frame 592. In some embodiments, each RTP packet may encapsulate tile data and slice header data. For example, the data entry of data structure 800 corresponding to RTP sequence number 10038 encapsulates data for tile number 8 and 9 of frame 592 and slice header 1 of frame 592. Data type 804 indicates whether the data encapsulates audio data. In some embodiments, audio data may correspond to multiple frames. For example, the data entry of data structure 800 corresponding to RTP sequence number 10039 encapsulates audio data. Audio data is not slice encoded, so the data entry of data structure 800 corresponding to RTP sequence number 10039 does not indicate a slice data and tile number 803 and is flagged as encapsulating audio. RTP multiplexed packet 805 contains header and data for the information encoded for RTP sequence number 801.

When a client device indicates that a data packet was lost or corrupted by requesting a retransmit of that packet via an RTCP request, the data structure 800 can be referenced to determine what data was in the packet. For example, the network congestion control receives RTCP feedback 809 indicating that RTP data packet 10034 was lost. The network controller sends a retransmit request to the Transmission Scheduler to retransmit the corrupt or lost packet. The Transmission Scheduler determines if that packet encapsulated audio or video. If it is video, then the Transmission Scheduler references data structure 800 to determine that RTP data packet 10034 contains data for tiles 0, 1, and 2 of frame 592. A request is then made to the encoder to encode the information contained by RTP data packet 10034 as an I-tile for the next frame to encode. All following tiles are then encoded as P-tiles for that tile. If the lost packet was an audio data packet which encapsulated audio data, the audio data packet is retransmitted.

Priority queue RTP packets 806 determines the priority for encoded RTP data packets and the order of transmission based on RTP sequence number. The encoder will encode the dropped or corrupted tioles as I-tiles into RTP data packet 807.

Figure 9:
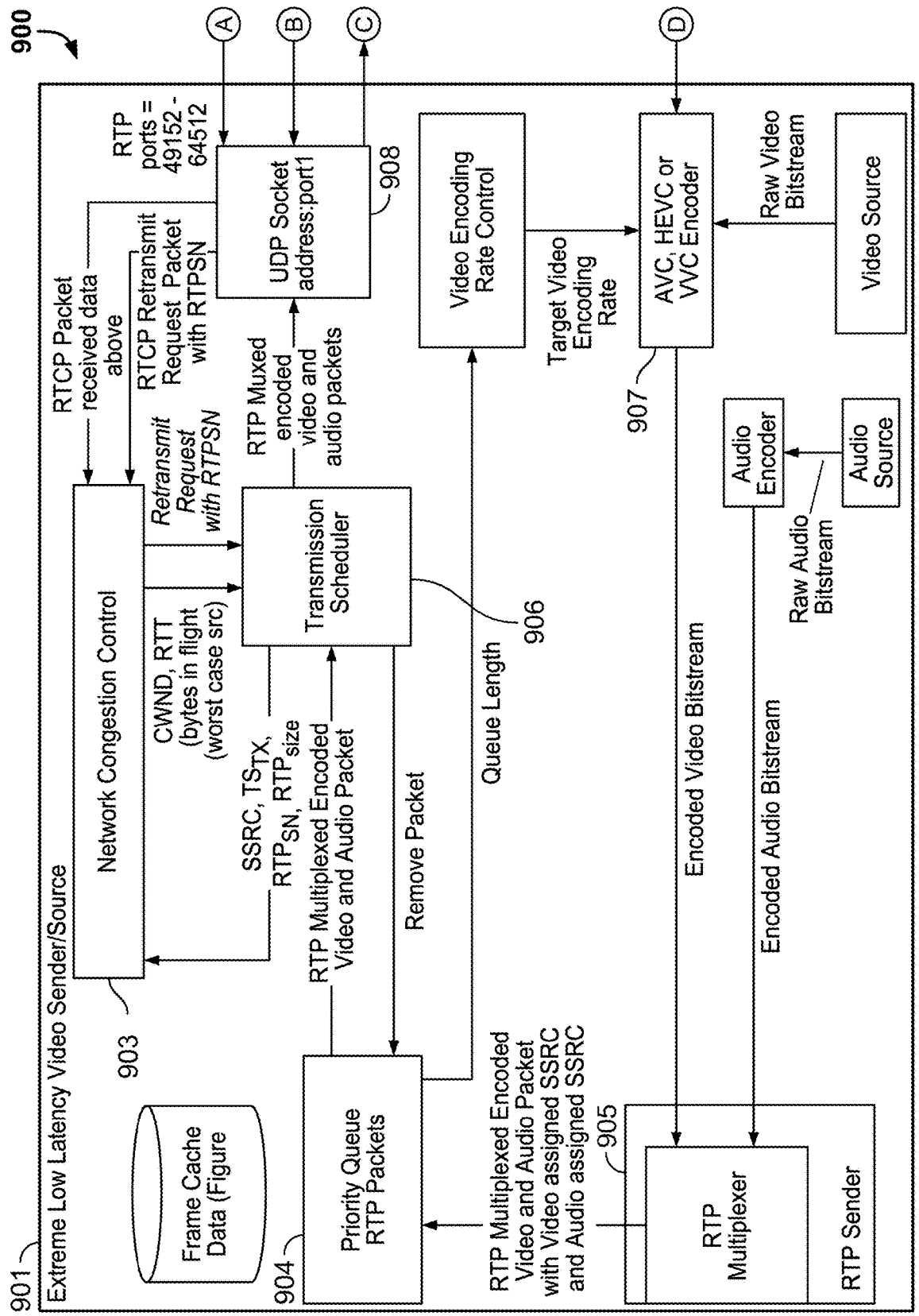
FIG. 9 shows a block diagram representing system architecture for low-latency data packet delivery, in accordance with some embodiments of the disclosure.
Figure 9:
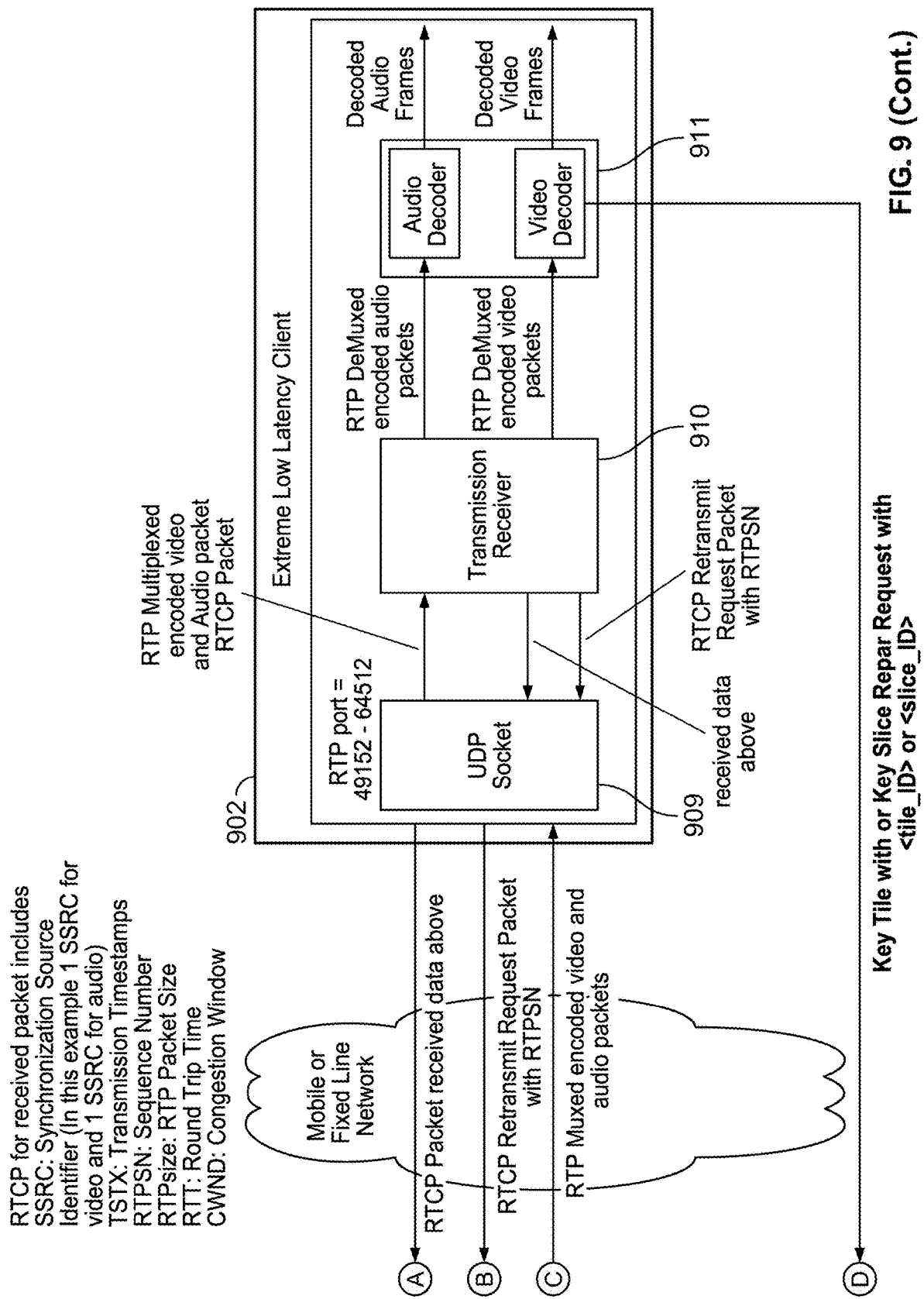

FIG. 9 shows a block diagram representing system architecture for low-latency data packet delivery, in accordance with some embodiments of the disclosure.

Extreme low latency repair system may be useful, for example, in remote rendered gaming (cloud or from an in-home console PS4, PS5, Xbox), SLAM, and XR cloud rendering system. In the case of SLAM, the extreme low latency video sender/source would be located on the client device and the extreme low latency client device would be located in the cloud. For remote rendered gaming, the extreme low latency video sender/source would be located in the cloud or on the console device and the extreme low latency client would be located on an XR Headset, phone, HDMI OTT video stick or STB or another console device. In this example the decoder on the extreme low latency client triggers key slice or key tile repair leveraging the configured technique previously described in connection with FIGS. 1*a*-8.

Architecture 900 comprises RTP packet source 901 and client device 902. Video source 900 comprises network congestion control 903, priority queue 904, multiplexer 905, transmission scheduler 906, encoder 907, and I/O circuitry 908. Client device 902 comprises I/O circuitry 909, transmission receiver 910, and decoder 911.

Congestion control 903 controls the bandwidth usage of the video source over the network connection. Priority queue 904 determines the order of transmission of data packets assembled by multiplexer 905. Multiplexer 905 assembles the data packets for transmission by multiplexing encoded segments generated by encoder 907. In some embodiments, multiplexer 905 is multiplexer 104 of FIG. 1*a*. In some embodiments, encoder 907 is encoder 103 of FIG. 1*a*. Encoder 907 may implement slice or tile encoding as discussed in connection with FIGS. 2-8. Transmission scheduler 906 schedules the timing of transmission of the data packets assembled by multiplexer 905. I/O circuitry 908 transmits the data packets to client device 902. In some embodiments, I/O circuitry 908 is a UDP socket.

I/O circuitry 909 of client device 902 receives the data packets from RTP packet source 901. In some embodiments, I/O circuitry 909 is a UDP socket. Transmission receiver 910 determines if each packet comprise audio or frame data for the video. It then transmits those data packets to decoder 911.

Figure 10:
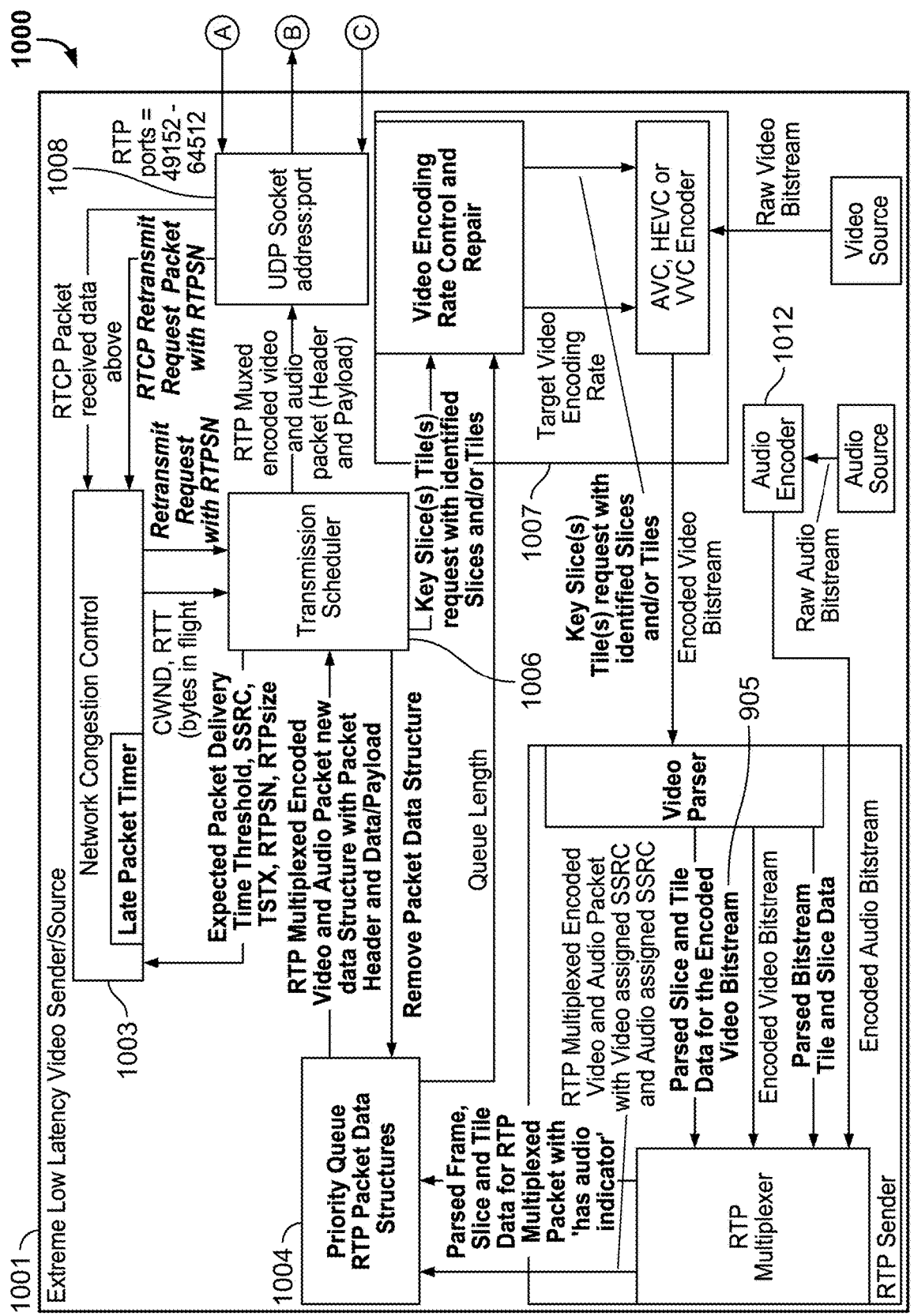
FIG. 10 shows a block diagram representing system architecture for low-latency data packet delivery, in accordance with some embodiments of the disclosure.
Figure 10:
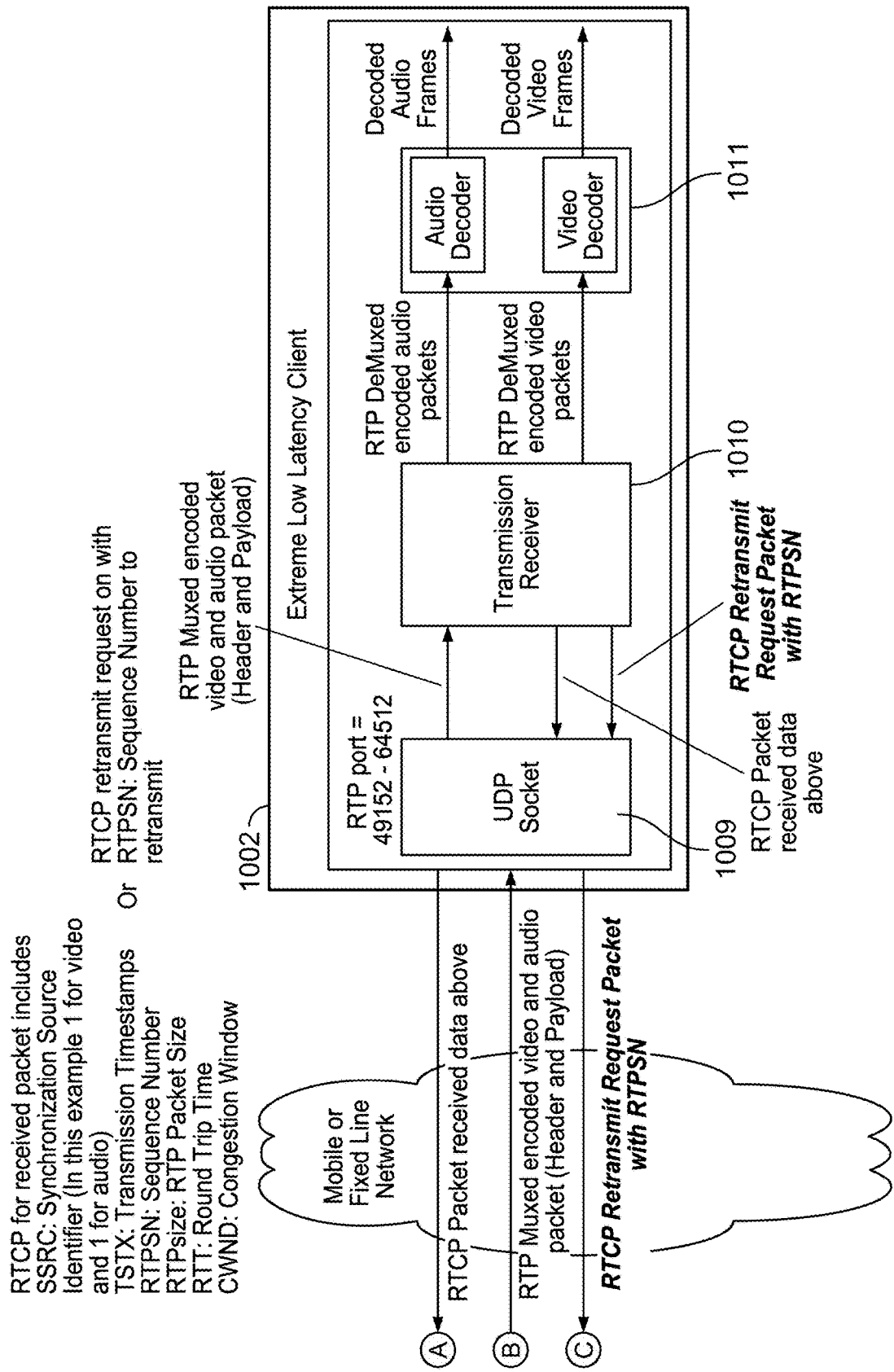

FIG. 10 shows a block diagram representing system architecture for low-latency data packet delivery, in accordance with some embodiments of the disclosure.

Architecture 1000 comprises RTP packet source 1001 and client device 1002. Video source 1000 comprises network congestion control 1003, priority queue 1004, multiplexer 1005, transmission scheduler 1006, encoder 1007, and I/O circuitry 1008. Client device 1002 comprises I/O circuitry 1009, transmission receiver 1010, and decoder 1011.

Congestion control 1003 controls the bandwidth usage of the video source over the network connection. Priority queue 1004 determines the order of transmission of data packets assembled by multiplexer 1005. Priority queue 1004 stores a data structure for the data packets. In some embodiments, the data structure is data structure 700 of FIG. 7. In some embodiments, the data structure is data structure 800 of FIG. 8

Multiplexer 1005 assembles the data packets for transmission by multiplexing a video encoded PES (Packetized Elementary Stream) generated by video encoder 1007 and an audio encoded PES generated by the audio encoder 1012. Encoder 1007 contains circuitry for repairing slices or tiles. In some embodiments, multiplexer 1005 is multiplexer 104 of FIG. 1*a*. In some embodiments, encoder 1007 is encoder 103 of FIG. 1*a*. Encoder 1007 may implement slice or tile encoding as discussed in connection with FIGS. 2-8. Transmission scheduler 1006 schedules the timing of transmission of the data packets assembled by multiplexer 1005. I/O circuitry 1008 transmits the data packets to client device 1002. In some embodiments, I/O circuitry 1008 is a UDP socket.

I/O circuitry 1009 of client device 1002 receives the RTP data packets from RTP packet source 1001. In some embodiments, I/O circuitry 1009 is a UDP socket. Transmission receiver 1010 determines if each packet comprise frame data for the video or audio. It then transmits those data packets to encoder 1011.

Figure 11:
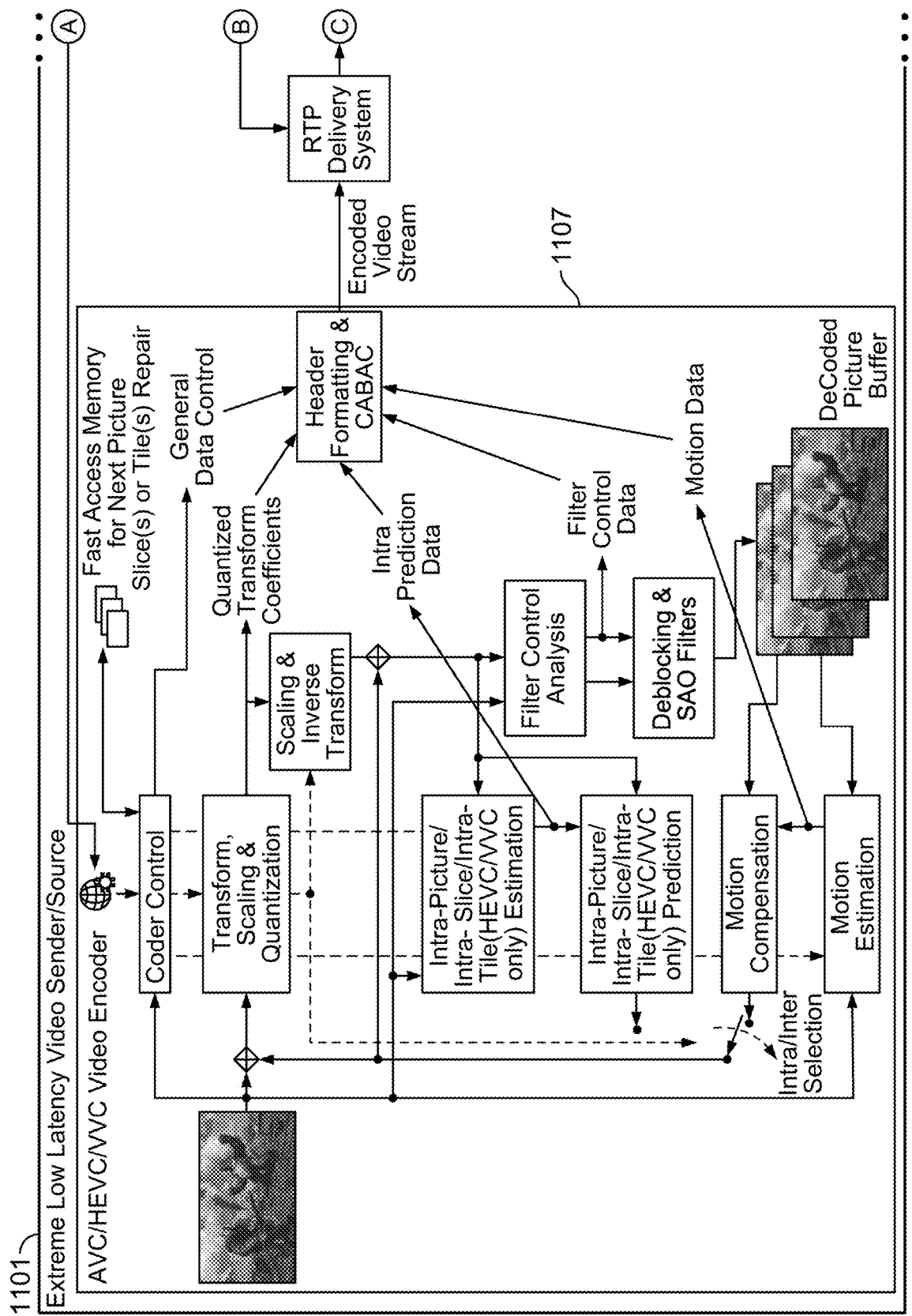
FIG. 11 shows a block diagram representing system architecture for low-latency data packet delivery and slice or tile repair, in accordance with some embodiments of the disclosure.
Figure 11:
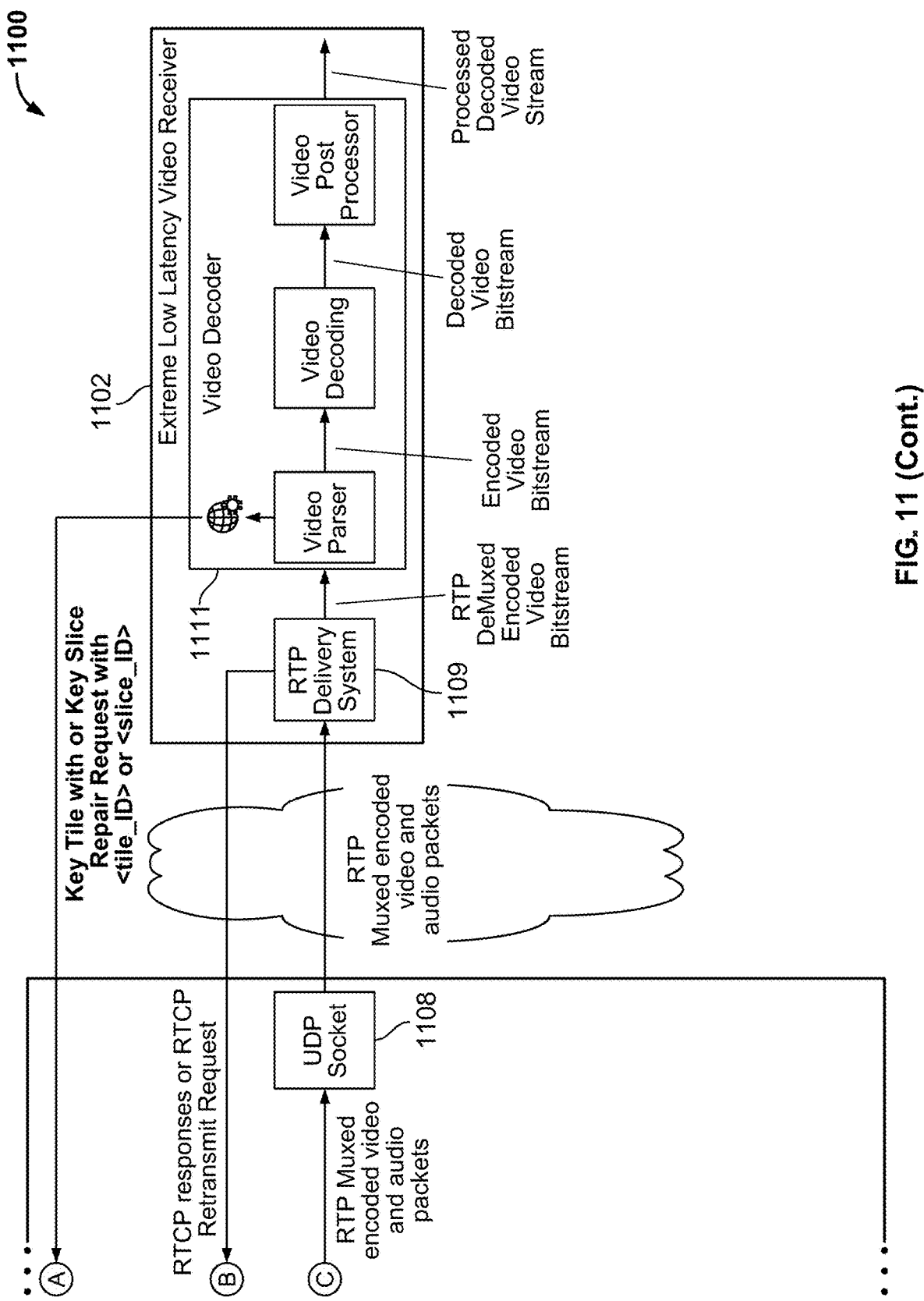

FIG. 11 shows a block diagram representing system architecture for low-latency data packet delivery and slice or tile repair, in accordance with some embodiments of the disclosure.

Architecture 1100 comprises video sender 1101 and client device 1102. Video source 1100 comprises encoder 1107 and I/O circuitry 1108. Encoder 1107 generates a video encoded PES of the video to be transmitted. In some embodiments, encoder 1107 is encoder 103 of FIG. 1*a*. Encoder 1107 may implement slice or tile encoding as discussed in connection with FIGS. 2-8. In some embodiments, encoder 1107 utilizes slice encoding the encode the video. In some embodiments, encoder 1107 selects slices and modifies encoding using deblocking filters, motion estimation and compensation, and scaling circuitry. I/O circuitry 1108 transmits the data packets to client device 1102. In some embodiments, I/O circuitry 1108 is a UDP socket. In some embodiments, encoder 1107 utilizes tile encoding the encode the video. In some embodiments, encoder 1107 selects tiles and modifies encoding using deblocking filters, motion estimation and compensation, and scaling circuitry. I/O circuitry 1108 transmits the data packets to client device 1102. In some embodiments, I/O circuitry 1108 is a UDP socket.

Client device 1102 comprises I/O circuitry 1109 and decoder 1111. I/O circuitry 1109 of client device 1102 receives the data packets from video sender 1101. Decoder 911 decode the data packets received from video sender 1101.

Figure 12:
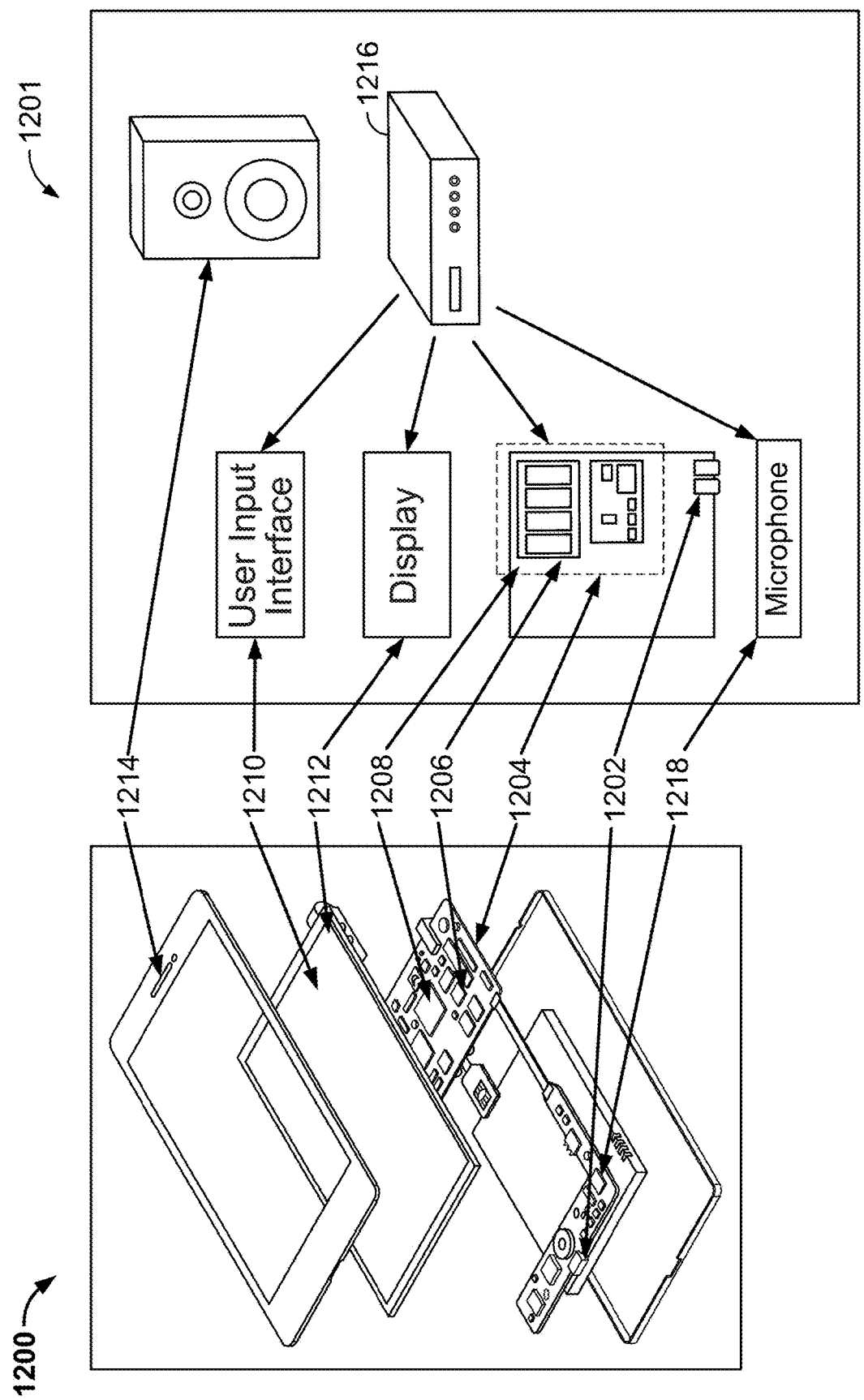
FIGS. 12-13 describe exemplary devices, systems, servers, and related hardware for streaming content in a low latency system, in accordance with some embodiments of the present disclosure.
Figure 13:
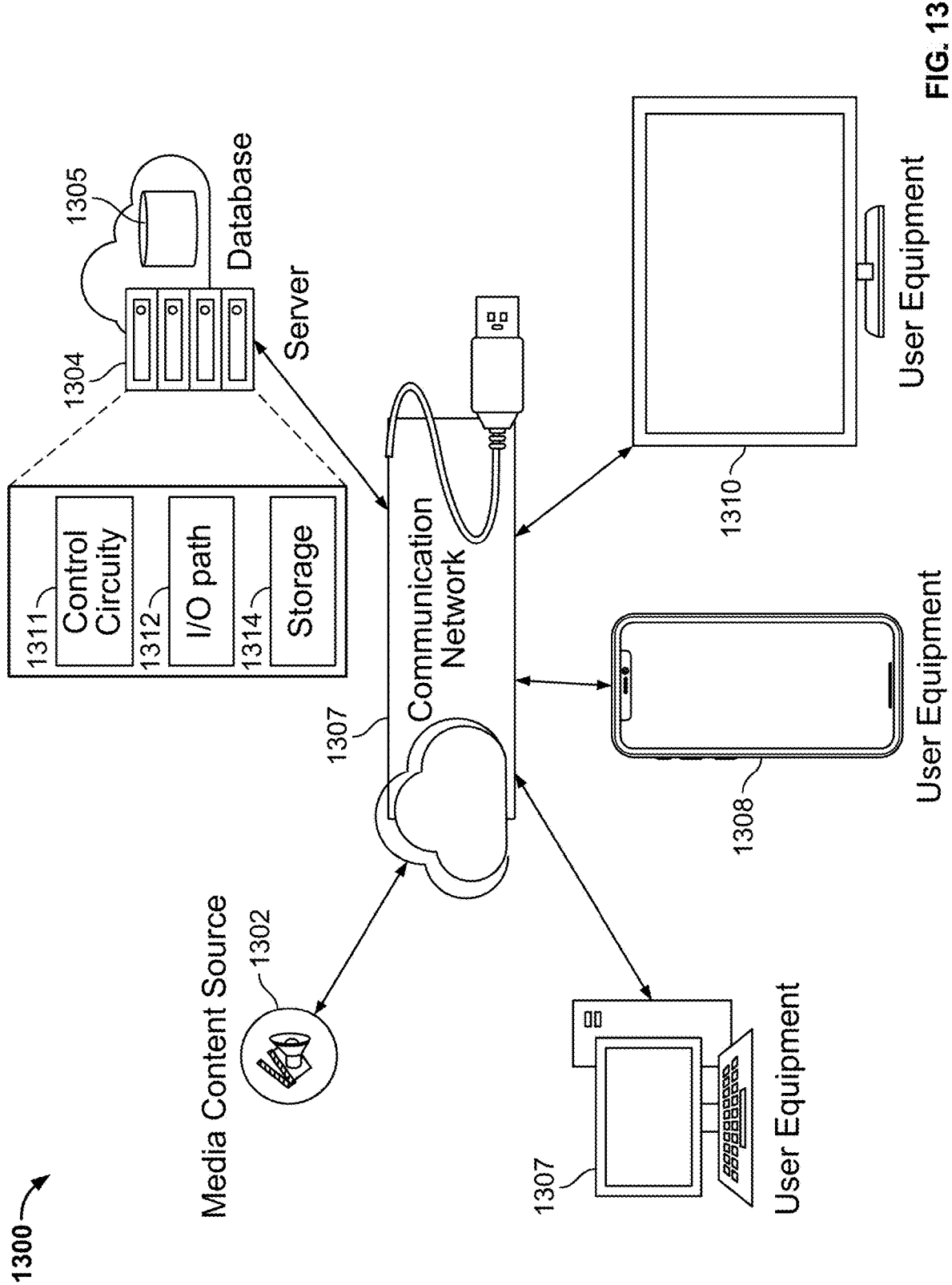

FIGS. 12-13 describe exemplary devices, systems, servers, and related hardware for streaming content in a low latency system, in accordance with some embodiments of the present disclosure. FIG. 12 shows generalized embodiments of illustrative user equipment devices 1200 and 1201. For example, user equipment device 1200 may be a smartphone device. In another example, user equipment system 1201 may be a user television equipment system. User television equipment system 1201 may include set-top box 1216. Set-top box 1216 may be communicatively connected to microphone 1218, speaker 1214, and display 1212. In some embodiments, microphone 1218 may receive voice commands for the media application. In some embodiments, display 1212 may be a television display or a computer display. In some embodiments, set-top box 1216 may be communicatively connected to user input interface 1210. In some embodiments, user input interface 1210 may be a remote control device. Set-top box 1216 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 12. Each one of user equipment device 1200 and user equipment system 1201 may receive content and data via input/output ("I/O") path 1202. I/O path 1202 may provide content (e.g., broadcast programming, on-demand programming, Internet content, content available over a local area network (LAN) or wide area network (WAN), and/or other content) and data to control circuitry 1204, which includes processing circuitry 1206 and storage 1208. Control circuitry 1204 may be used to send and receive commands, requests, and other suitable data using I/O path 1202, which may comprise I/O circuitry. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing.

Control circuitry 1204 may be based on any suitable processing circuitry such as processing circuitry 1206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for a media application stored in memory (i.e., storage 1208). Specifically, control circuitry 1204 may be instructed by the media application to perform the functions discussed above and below. In some implementations, any action performed by control circuitry 1204 may be based on instructions received from the media application.

In client/server-based embodiments, control circuitry 1204 may include communications circuitry suitable for communicating with a media application server or other networks or servers. The instructions for carrying out the above mentioned functionality may be stored on a server (which is described in more detail in connection with FIG. 12. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 12). In addition, communications circuitry may include circuitry that enables peer-to-peer communication of user equipment devices, or communication of user equipment devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as media application data described above. Nonvolatile memory may also be used (e.g., to launch a boot-up routine and other instructions). Cloud-based storage, described in relation to FIG. 12, may be used to supplement storage 1208 or instead of storage 1208.

Control circuitry 1204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of user equipment 1200. Circuitry 1204 may also include digital-to-analog converter circuitry and analog-to-digital converter circuitry for converting between digital and analog signals. The tuning and encoding circuitry may be used by user equipment device 1200, 1201 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user equipment device 1200, the tuning and encoding circuitry (including multiple tuners) may be associated with storage 1208.

A user may send instructions to control circuitry 1204 using user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of each one of user equipment device 1200 and user equipment system 1201. For example, display 1212 may be a touch-screen or touch-sensitive display. In such circumstances, user input interface 1210 may be integrated with or combined with display 1212. Display 1212 may be one or more of a monitor, a television, a display for a mobile device, or any other type of display. A video card or graphics card may generate the output to display 1212. The video card may be any processing circuitry described above in relation to control circuitry 1204. The video card may be integrated with the control circuitry 1204. Speakers 1214 may be provided as integrated with other elements of each one of user equipment device 1200 and user equipment system 1201 or may be stand-alone units. The audio component of videos and other content displayed on display 1212 may be played through the speakers 1214. In some embodiments, the audio may be distributed to a receiver (not shown), which processes and outputs the audio via speakers 1214.

The media application may be implemented using any suitable architecture. For example, it may be a stand-alone application wholly-implemented on each one of user equipment device 1200 and user equipment system 1201. In such an approach, instructions of the application are stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to rearrange the segments as discussed. Based on the processed instructions, control circuitry 1204 may determine what action to perform when input is received from user input interface 1210. For example, movement of a cursor on a display up/down may be indicated by the processed instructions when user input interface 1210 indicates that an up/down button was selected.

In some embodiments, the media application is a client/server-based application. Data for use by a thick or thin client implemented on each one of user equipment device 1200 and user equipment system 1201 is retrieved on-demand by issuing requests to a server remote to each one of user equipment device 1200 and user equipment system 1201. In one example of a client/server-based guidance application, control circuitry 1204 runs a web browser that interprets web pages provided by a remote server. For example, the remote server may store the instructions for the application in a storage device. The remote server may process the stored instructions using circuitry (e.g., control circuitry 1204) to perform the operations discussed in connection with FIGS. 1-11.

In some embodiments, the media application may be downloaded and interpreted or otherwise run by an interpreter or virtual machine (run by control circuitry 1204). In some embodiments, the media application may be encoded in the ETV Binary Interchange Format (EBIF), received by the control circuitry 1204 as part of a suitable feed, and interpreted by a user agent running on control circuitry 1204. For example, the media application may be an EBIF application. In some embodiments, the media application may be defined by a series of JAVA-based files that are received and run by a local virtual machine or other suitable middleware executed by control circuitry 1204. In some of such embodiments (e.g., those employing MPEG-2 or other digital media encoding schemes), the media application may be, for example, encoded and transmitted in an MPEG-2 object carousel with the MPEG audio and video packets of a program.

FIG. 13 is a diagram of an illustrative streaming system, in accordance with some embodiments of the disclosure. User equipment devices 1307, 1307, 1310 (e.g., user equipment device 106) may be coupled to communication network 1306. Communication network 1306 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 1306) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 13 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1306.

System 1300 includes a media content source 1302 and a server 1304, which may comprise or be associated with database 1305. Communications with media content source 1302 and server 1304 may be exchanged over one or more communications paths but are shown as a single path in FIG. 13 to avoid overcomplicating the drawing. In addition, there may be more than one of each of media content source 1302 and server 1304, but only one of each is shown in FIG. 13 to avoid overcomplicating the drawing. If desired, media content source 1302 and server 1304 may be integrated as one source device.

In some embodiments, server 1304 may include control circuitry 1311 and a storage 1314 (e.g., RAM, ROM, Hard Disk, Removable Disk, etc.). Server 1304 may also include an input/output path 1312. I/O path 1312 may provide device information, or other data, over a local area network (LAN) or wide area network (WAN), and/or other content and data to the control circuitry 1311, which includes processing circuitry, and storage 1314. The control circuitry 1311 may be used to send and receive commands, requests, and other suitable data using I/O path 1312, which may comprise I/O circuitry. I/O path 1312 may connect control circuitry 1304 (and specifically processing circuitry) to one or more communications paths.

Control circuitry 1311 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1311 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 1311 executes instructions for an emulation system application stored in memory (e.g., the storage 1314). Memory may be an electronic storage device provided as storage 1314 that is part of control circuitry 1311.

Server 1304 may retrieve guidance data from media content source 1302, process the data as will be described in detail below, and forward the data to \ user equipment devices 1307 and 1310. Media content source 1302 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 1302 may be the originator of content (e.g., a television broadcaster, a Webcast provider, etc.) or may not be the originator of content (e.g., an on-demand content provider, an Internet provider of content of broadcast programs for downloading, etc.). Media content source 1302 may include cable sources, satellite providers, on-demand providers, Internet providers, over-the-top content providers, or other providers of content. Media content source 1302 may also include a remote media server used to store different types of content (including video content selected by a user), in a location remote from any of the client devices. Media content source 1302 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 1304), which may be located centrally or at distributed locations, that provide cloud-based services to various types of users and devices connected via a network such as the Internet via communication network 1306. In such embodiments, user equipment devices may operate in a peer-to-peer manner without communicating with a central server.

Figure 14:
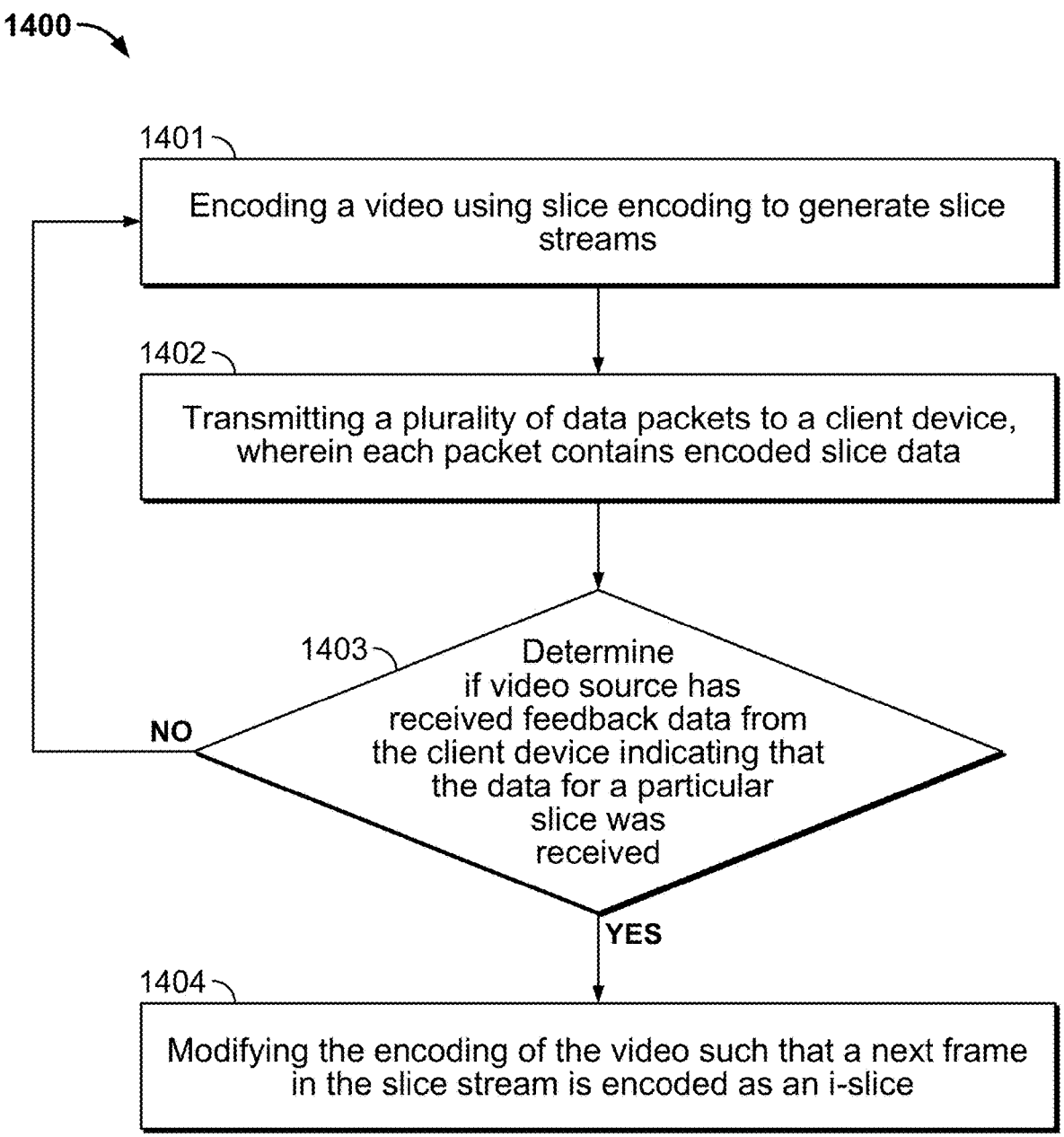
FIG. 14 shows a flowchart of illustrative steps involved in modifying encoding of a video in response to a packet being lost or corrupted, in accordance with some embodiments of the present disclosure.

FIG. 14 shows a flowchart of illustrative steps involved in modifying encoding of a video in response to a packet being lost or corrupted, in accordance with some embodiments of the present disclosure. Process 1400 may be implemented at a video source such as video source 102 of FIG. 1*a*.

At 1401, an encoder at the video source which encodes a video using slice encoding or tile encoding to generate slice streams or tile streams. In some embodiments, the encoding may be performed at an encoder such as encoder 103 of FIG. 1*a*. The slice encoding or tile encoding may be performed using any of the encoding methods described in connection with FIGS. 2-6. At 1402, input/output circuitry at the video source transmits a plurality of data packets to a client device. In some embodiments, each data packet contains encoded slice data or tile data. In some embodiments, the data packets may be generated using any of the techniques of FIGS. 7-8. Each data entry of data structure 700 of FIG. 8 and data structure 800 of FIG. 8 corresponds to a data packet.

At 1403, control circuitry at the video source determines if it received feedback data from the client device indicating that the data for a particular slice was not received. In some embodiments, this feedback is implemented as in step 6 of FIG. 1*c*. In some embodiments, this feedback is implemented as feedback 709 of FIG. 7. In some embodiments, this feedback is implemented as feedback 809 of FIG. 8.

If the control circuitry at the video source determines that it did receive the feedback, then at 1404, the encoder at the video source modifies the encoding of the video such that a next frame in the slice stream is encoded as an I-slice. In some embodiments, the modified encoding may be implemented as in step 8 of FIG. 1*c*. The slice encoding may be performed using any of the encoding methods described in connection with FIGS. 2-6. In some embodiments, control circuitry at the video source references a data structure to determine which slices in a lost or corrupted data packet require modified encoding. In some embodiments, the data structure may be data structure 700 of FIG. 7 or data structure 800 of FIG. 8. If the video source determines that it did not receive the feedback, then the system continues to encode the video.

In some embodiments, the encoder, control circuitry, and input/output circuitry may be hosted as an application. The application may implement instructions which when executed cause the encoder, control circuitry, and input/output circuitry to perform the functions described above.

FIG. 15 shows flowchart 1500 of illustrative steps involved in transmitting repair packets for a dropped or corrupted packet, in accordance with some embodiments of the present disclosure.

At 1501, a transmission receiver on the client device connects to the server. In some embodiments, this connection is established using user datagram protocol (UDP). At 1502, the transmission receiver on the client device receives RTP data packets containing encapsulated encoded information for the video and RTP data packets containing encapsulated encoded information for the audio. In some embodiments, the data packets are assembled by multiplexing the video and audio data into RTP data packets. In some embodiments, the data packets may be assembled as a in data structure 700 of FIG. 7 and data structure 800 of FIG. 8. At 1503, the system determines whether the expected data packet matches the received data packet.

If the expected data packet sequence number does not match the received data packet sequence number, the system proceeds to 1504. At 1504, the RTP Transmission Receiver configures an RTCP request for retransmitting the packet to the RTP Sender. In some embodiments, the response is a real-time transport control protocol (RTCP) response. In some embodiments, the video source may modify the encoding in accordance with the methods disclosed in connection with FIGS. 1*a*-1*c*.

If the expected data packet matches the received data packet, the system proceeds to 1505. At 1505, the transmission receiver on the client device configures a response to the server indicating that the packet was receive. In some embodiments, the response is a real-time transport control protocol (RTCP) response.

At 1506, the transmission receiver at the client device transmits the response generated at either 1504 or 1505 to the video source. In some embodiments, the response is an RTCP packet and is transmitted using a UDP.

FIG. 16 shows a flowchart of illustrative steps involved in transmitting slice data using an RTP data packets, in accordance with some embodiments of the present disclosure.

At 1601, the encoder at the video source is configured with the slice or tile structure for the video. In some embodiments, the slice encoder is configured to divide each fame into a set number of slices. In some embodiments, the tile encoder is configured to divide each fame into a set number of tiles. In some embodiments, the encoder is configured to apply any of the slice encoding and tile encoding methods of FIGS. 2-6. At 1602, the I/O circuitry of the video source is configured to generate a source identifier to include in the header information of data packets it transmits. In some embodiments, the I/O circuitry is an RTP sender configured with a synchronization source identifier (SSRC) which identifies the source of the stream of RTP packets. This identifier is unique and consistent throughout the RTP session. At 1603, a client device requests to begin a low-latency video session with the video source. At 1604, the video source transmits an invitation to the client device. In some embodiments, this invitation is an RTP URL. At 1604, the client device accepts the connection. In some embodiments, the connection is a user datagram protocol (UDP) socket.

At 1606, the video source begins encoding the video. At 1606, the audio source is encoded based on the audio encoding parameters and the video source is encoded with the video encoding parameters.

In some embodiments, the video source encodes the video with the methods disclosed in connection with FIGS. 2-6. At 1609, the RTP sender multiplexes the encoded video data and encoded audio into RTP data packets for transmission In some embodiments, the data packets are multiplexed using methods disclosed in connection with FIGS. 6-7.

At 1610, the RTP Multiplexer determines if a data packet contains audio. At 1611, the RTP Multiplexer determines if a data packet contains frames of the video. If the RTP packet does contain video, then at 1612, the RTP multiplexer stores a data structure with the multiplexed data packet information. In some embodiments, the data structure is data structure 700 of FIG. 7. In some embodiments, the data structure is data structure 800 of FIG. 8. At 1613, the video source transmits the data packets to the user device.

Figure 17:
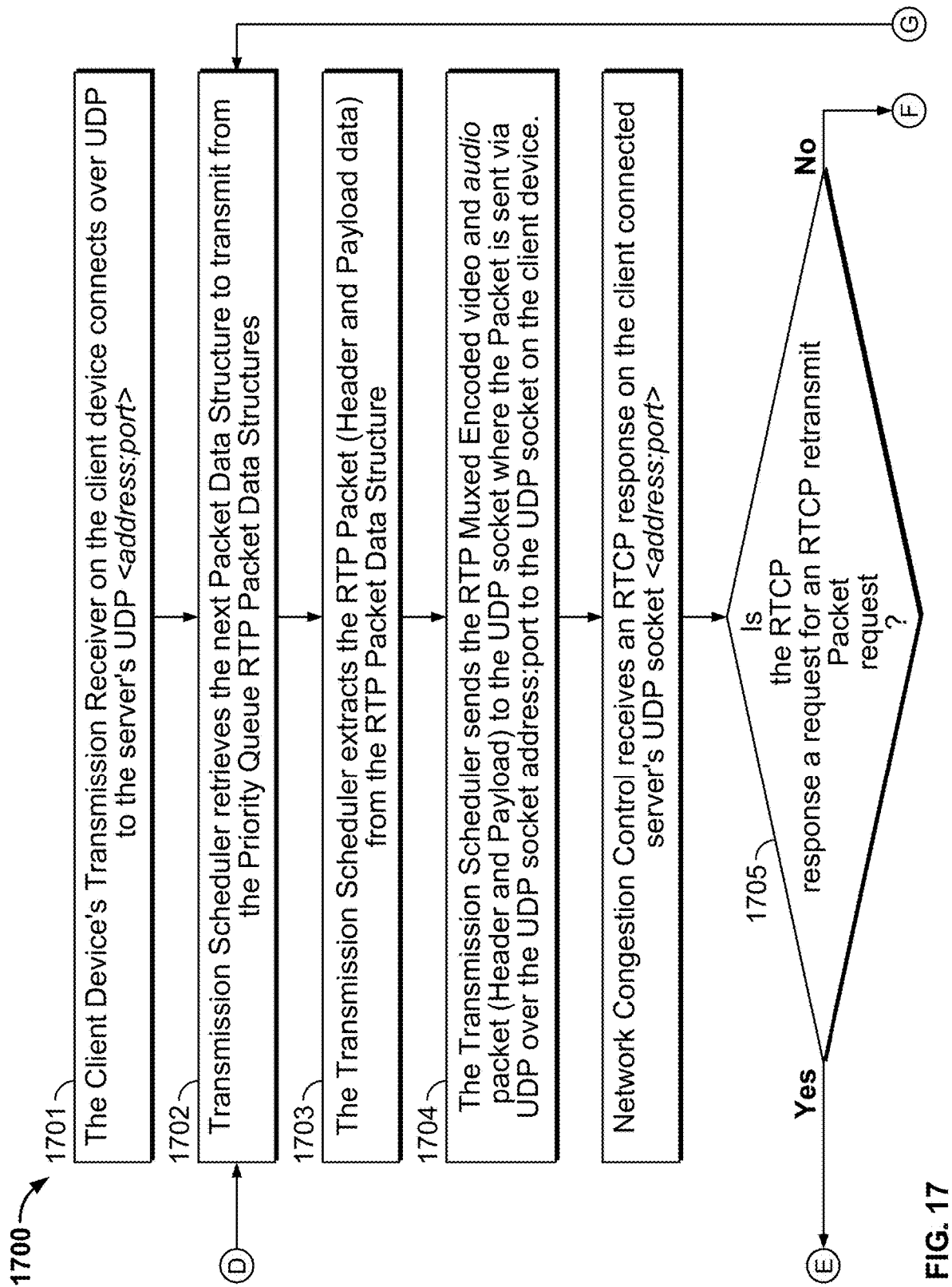
FIG. 17 shows a flowchart of illustrative steps involved in receiving a response from a client device and modifying encoding based on the response, in accordance with some embodiments of the present disclosure.

FIG. 17 shows a flowchart of illustrative steps involved in receiving a response from a client device and modifying encoding based on the response, in accordance with some embodiments of the present disclosure.

At 1701, a receiver at the client device connects to the server. In some embodiments, the client device connects over UDP to the server's UDP address. At 1702, the transmission scheduler at the server retrieves the next data packet structure to transmit from the queue. At 1703, the transmission scheduler extracts the data packet from the data packet structure. At 1704, the transmission scheduler sends the RTP data packet to the client device.

At 1705, the video source determines if it has a received an RTCP response from the client device requesting a retransmission of a packet. In some embodiments, the response is the feedback in step 6 of FIG. 1c. In some embodiments, the response is feedback 709 of FIG. 7. In some embodiments, the response is feedback 809 of FIG. 8. If the response does indicate a request for a retransmission, then at 1706 the network congestion control at the video source informs the transmission scheduler of the retransmission request. In some embodiments, network congestion control is congestion control 903 of FIG. 9. At 1707, the video source determines if a data packet contains audio. At 1708, the Transmission Scheduler determines the content of the packet requested for retransmission. In some embodiments, the video source accesses a data structure to check what content was in the packet. In some embodiments, the data structure is data structure 700 of FIG. 7. In some embodiments, the data structure is data structure 800 of FIG. 8. If the response does not indicate a request for a retransmission, then at 1708 the video source continues to transmit data packets containing data of the video or audio.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    encoding, at an encoder, a video comprising a plurality of frames using slice encoding wherein the slice encoding comprises:
        defining a slice structure comprising a plurality of slices, wherein each slice of the plurality of slices comprises pixel data for a respective same location in each frame of the plurality of frames; and
        for each slice of the plurality of slices, separately encoding a respective slice stream, the encoded slice stream comprising, for each frame of the plurality of frames, one of: (a) an I-slice or (b) a P-slice, wherein:
            each I-slice comprises all data for decoding the respective I-slice, and each P-slice comprises respective predictive data that can only be decoded using at least an I-slice or P-slice that precedes the respective P-slice in the respective slice stream;
    transmitting a plurality of data packets to a client device, wherein each data packet of the plurality of data packets comprises encoded slice data of at least one slice of a frame of the plurality of frames;
    establishing a direct connection between the encoder and a decoder executing on the client device, wherein the direct connection is established as a separate connection in addition to a connection for transmitting the video from the encoder to the client device;
    receiving feedback data from the client device indicating that a particular slice in the particular frame was not received or was corrupted by receiving an Application Programming Interface (API) communication from the decoder via the direct connection; and
    in response to the receiving the feedback data:
        modifying the encoding of the video such that a slice in a next frame to be encoded in the slice stream of the particular slice is an I-slice.

2. The method of claim 1, wherein the plurality of data packets comprises a plurality of video data packets, and wherein the receiving the feedback data from the client device indicating that the particular slice in the particular frame was not received or was corrupted comprises:
    receiving an indication that a particular video data packet of the plurality of data packets was not received in time at the client device, wherein the particular video data packet comprises the particular slice in the particular frame.

3. The method of claim 2, further comprising:
    in response to the receiving the feedback data:
        refraining from retransmitting the particular video data packet.

4. A method:
    encoding, at an encoder, a video comprising a plurality of frames using slice encoding wherein the slice encoding comprises:
        defining a slice structure comprising a plurality of slices, wherein each slice of the plurality of slices comprises pixel data for a respective same location in each frame of the plurality of frames; and
        for each slice of the plurality of slices, separately encoding a respective slice stream, the encoded slice stream comprising, for each frame of the plurality of frames, one of: (a) an I-slice or (b) a P-slice, wherein:
            each I-slice comprises all data for decoding the respective I-slice, and each P-slice comprises respective predictive data that can only be decoded using at least an I-slice or P-slice that precedes the respective P-slice in the respective slice stream;

transmitting a plurality of data packets to a client device, wherein each data packet of the plurality of data packets comprises encoded slice data of at least one slice of a frame of the plurality of frames;

receiving feedback data from the client device indicating that (a) a particular slice in the particular frame was not received or was corrupted and (b) an audio data packet was not received or was corrupted; and in response to receiving the feedback data:
  modifying the encoding of the video such that a slice in a next frame to be encoded in the slice stream of the particular slice is an I-slice; and
  retransmitting the audio data packet.

5. The method of claim 1, wherein the defining the slice structure comprises:
  defining a plurality of tiles, wherein a tile comprises pixel data for a rectangular region of each frame of the plurality of frames.

6. The method of claim 1, wherein the defining the slice structure comprises:
  defining each slice of the plurality of slices as a sub-partition wherein a sub-partition comprises pixel data for a region of each frame of the plurality of frames.

7. The method of claim 1, wherein the plurality of frames comprises a plurality of sequential frames, wherein each frame is associated with a sequence number, wherein the plurality of data packets comprises a plurality of video data packets and wherein the method further comprises:
  assembling a packetized elementary stream (PES) packet for each frame of the plurality of frames, wherein the PES packet comprises all slices of a frame of the plurality of sequential frames with a particular sequence number.

8. The method of claim 7, further comprising:
  assembling a plurality of Real-Time Transport Protocol (RTP) data packets by multiplexing the PES packet into the plurality of RTP data packets, wherein each RTP data packet of the plurality of RTP data packets comprises a subset of all the slices of the frame with the particular sequence number and wherein each RTP data packet is associated with an RTP sequence number;
  storing information indicating the subset of all the slices of the frame with the particular sequence number stored in each RTP data packet.

9. The method of claim 7, further comprising:
  storing a data structure that defines for each RTP data packet of the plurality of RTP data packets:
    (a) a respective RTP sequence number;
    (b) identification of slices multiplexed into the respective RTP data packet; and
    (c) a sequence number of a frame of the slices identified by the identification of slices.

10. The method of claim 9, wherein the receiving the feedback data from the client device indicating that the particular slice in the particular frame was not received or was corrupted comprises:
  receiving from the client device a particular RTP sequence number; and
  cross referencing the particular RTP sequence number with the data structure to identify the particular slice.

11. The method of claim 9, wherein the identification of slices multiplexed into the respective RTP data packet comprises:

selecting each slice of the slices multiplexed into the respective RTP data packet such that each slice comprises pixel data for a plurality of pixels located directly adjacent to another slice in the slices multiplexed into the respective RTP data packet.

12. The method of claim 9, wherein the identification of slices multiplexed into the respective RTP data packet comprises:
  selecting each slice of the slices multiplexed into the respective RTP data packet such that each slice comprises pixel data for a plurality of pixels and is selected randomly.

13. The method of claim 1, further comprising, in response to the receiving the feedback data:
  determining a number of slices in the particular frame which were not received or corrupted;
  in response to determining that the number of slices in the particular frame which were not received or corrupted is larger than a threshold value, modifying the encoding of the video such that a next frame is encoded as an I-frame, wherein each slice in the particular frame are encoded as an I-slice.

14. A system comprising:
  an encoder configured to:
    encode a video comprising a plurality of frames using slice encoding wherein the slice encoding comprises:
      defining a slice structure comprising a plurality of slices, wherein each slice of the plurality of slices comprises pixel data for a respective same location in each frame of the plurality of frames; and
      for each slice of the plurality of slices, separately encoding a respective slice stream, the encoded slice stream comprising, for each frame of the plurality of frames, one of: (a) an I-slice or (b) a P-slice, wherein:
        each I-slice comprises all data for decoding the respective I-slice, and each P-slice comprises respective predictive data that can only be decoded using at least an I-slice or P-slice that precedes the respective P-slice in the respective slice stream;
  input/output circuitry configured to:
    transmit a plurality of data packets to a client device, wherein each data packet of the plurality of data packets comprises encoded slice data of at least one slice of a frame of the plurality of frames;
    receive feedback data from the client device indicating that a particular slice in the particular frame was not received or was corrupted; and
  control circuitry configured to:
    in response to the receiving the feedback data:
      modify the encoding of the video such that a slice in a next frame to be encoded in the slice stream of the particular slice is an I-slice.

15. The system of claim 14, wherein the plurality of data packets comprises a plurality of video data packets, and wherein the input/output circuitry receives the feedback data from the client device indicating that the particular slice in the particular frame was not received or was corrupted by:
  receiving an indication that a particular video data packet of the plurality of data packets was not received in time at the client device, wherein the particular video data packet comprises the particular slice in the particular frame.

16. The system of claim 15, wherein the control circuitry is further configured to, in response to the receiving the feedback data:

refrain from retransmitting the particular video data packet.

17. The system of claim 14, wherein the input/output circuitry is further configured to:
   receive feedback data from the client device indicating that an audio data packet was not received or was corrupted; and
   in response to receiving the feedback data:
      retransmit the audio data packet.

18. The system of claim 14, wherein the encoder is further configured to define the slice structure by:
   defining a plurality of tiles, wherein a tile comprises pixel data for a rectangular region of each frame of the plurality of frames.

* * * * *